United States Patent
Jenkins et al.

[11] Patent Number: 5,917,596
[45] Date of Patent: Jun. 29, 1999

[54] RADIATION FIELD ANALYZER USING INTERFERENCE PATTERNS

[75] Inventors: Richard Michael Jenkins; Robert W. J. Devereux, both of Malvern, United Kingdom

[73] Assignee: The Secretary of State for Defence in Her Brittanic Majesty's Government of the United Kingdom of Great Britain and Northern Ireland, Hants, United Kingdom

[21] Appl. No.: 08/968,491

[22] Filed: Nov. 12, 1997

Related U.S. Application Data

[63] Continuation-in-part of application No. PCT/GB97/00166, Jan. 22, 1997.

[30] Foreign Application Priority Data

Jan. 26, 1996 [GB] United Kingdom ............ 9601645
Jul. 19, 1996 [GB] United Kingdom ............ 9615240
Jun. 16, 1997 [GB] United Kingdom ............ 9712425

[51] Int. Cl.$^6$ .................................................. G01B 9/02
[52] U.S. Cl. ................... 356/345; 356/351; 324/76.21
[58] Field of Search ........................ 356/345, 346, 356/349, 4.09, 4.1, 351; 250/227.19, 227.27; 385/12, 14; 324/76.19, 76.27

[56] References Cited

U.S. PATENT DOCUMENTS 5,689,335  11/1997  Strauss ........................... 356/349

*Primary Examiner*—Samuel A. Turner
*Attorney, Agent, or Firm*—Nixon & Vanderhye P.C.

[57] ABSTRACT

A radiation field analyzer (10) provides means for analyzing the spatial mode spectrum of radiation received from a scene. In a multimode waveguide embodiment, light from a laser (24) is directed towards a scene through an alumina waveguide structure (12). A portion of the laser light is directed towards a mode generator (28) which selectively converts the laser radiation into one of a series of modes. Laser light returning from the scene is mixed with the light from the mode generator to produce interference signals. These signals are measured by a detector (34) and analyzed by a programmed computer (36). By sequentially altering the mode generated by the generator (28) and analyzing the resulting signals, a spectrum of the modes returning from the scene is obtained.

57 Claims, 13 Drawing Sheets

$EH_{11}$ $EH_{21}$ $EH_{31}$ $EH_{41}$ $EH_{51}$ $EH_{61}$ $EH_{71}$ $EH_{81}$ $EH_{91}$ $EH_{10.1}$ $EH_{11}$ $EH_{12}$ $EH_{13}$ $EH_{14}$ $EH_{15}$ $EH_{16}$ $EH_{17}$ $EH_{18}$ $EH_{19}$ $EH_{1.10}$

RADIATION FIELD ANALYZER USING INTERFERENCE PATTERNS

This application is a continuation-in-part of PCT/GB97/00166 filed Jan. 22, 1997.

BACKGROUND OF THE INVENTION

1. Field of the Invention

This invention relates to radiation field analyzers.

2. Discussion of Prior Art

When a laser source illuminates a scene with coherent radiation the return field contains a significant amount of information about its three dimensional structure and the nature of its surface. The analysis of such fields provides an important basis for target search, tracking and non-cooperative identification procedures. Single aperture single detector heterodyne detection systems with fundamental mode local oscillators are only able to detect the fundamental mode component of the field returned from a scene with the result that a considerable amount of potentially useful information is lost. In the microwave domain this problem is overcome by using an array of sub-apertures. The radiation arriving at each sub-aperture is coherently detected with a separate local oscillator source and detector. In this manner the field across the array is measured in a piece-wise manner. Because of the much shorter wavelength of optical radiation and the different technologies involved, the implementation of sub-aperture receiver array concepts in the analysis of field returns from scenes illuminated with laser radiation has proved difficult in practice.

SUMMARY OF THE INVENTION

It is an object of the invention to provide an alternative form of radiation field analyzer.

The present invention provides a radiation field analyzer for analyzing at least partially coherent radiation received from a scene characterized in that the analyzer includes a radiation combiner for combining said received radiation from the scene with each of a plurality of orthogonal spatial radiation mode fields to provide interference signals, and detecting means for detecting the interference signals and for providing an analysis of the radiation from the scene in the form of a spatial mode spectrum.

In order to generate the interference signals, a degree of coherency must exist between the received radiation and the orthogonal spatial radiation mode signals. The term "scene" is used in a generic sense to include any object in a field of view, including both a ground-scene and individual targets or objects such as aircraft in the sky. The radiation from a scene may be characterized in terms of an orthogonal set of free space modes (e.g. Hermite-Gaussian) or those of a multimode waveguide (e.g. the hybrid $EH_{mn}$ modes of a square sectioned waveguide where m and n are modal integer numbers greater than or equal to 1). In terms of a waveguide mode analysis the field from the scene, $E_{input}$, is imaged on the entrance aperture of the waveguide where it excites a spectrum of modes. This process can be expressed as:

$$E_{input} = \Sigma A_{mn} \exp\{i\phi_{mn}\} EH_{mn}.$$

Here $A_{mn}$ and $\phi_{mn}$ are the modulus and phase of the complex amplitude of the $mn^{th}$ waveguide mode $EH_{mn}$ respectively.

For example, for the general case of lossless rectangular waveguides of cross-section 2a×2b the field amplitude of the $EH_{mn}$ mode would have the form:

$$EH_{mn}(x, y, z) = \frac{1}{\sqrt{ab}} \cos[m\pi x/(2a)]\cos[n\pi y/(2b)]\exp(-\beta_{mn} z)$$

for m and n odd and:

$$EH_{mn}(x, y, z) = \frac{1}{\sqrt{ab}} \sin[m\pi x/(2a)]\sin[n\pi y/(2b)]\exp(i\beta_{mn} z)$$

for m and n even, where:

$$\beta_{mn} = \frac{2\pi}{\lambda_c}\left[1 - \frac{1}{2}\left\{\left(\frac{m\lambda_c}{4a}\right)^2 + \left(\frac{n\lambda_c}{4b}\right)^2\right\}\right]$$

and $\lambda_c$ is the wavelength of a perfect plane wave in the core of the guide.

By mixing the spectrum of modes excited in the waveguide by the radiation received from a scene with known modes produced by a tunable mode generator, which is also frequency offset from the radiation from the scene, the relative amplitudes and phases of the modes excited by the radiation from the scene in the waveguide can be determined by appropriate measurements of the beat signals produced using a detector.

The invention provides the advantage that the modes excited by the radiation from the scene are used to categorize the scene. In consequence, systems based on the analyzer of the invention may be set to register when certain radiation modes are detected and hence when certain particular targets or objects are present without recourse to a human operator. Moreover, as a scene is categorized by modes, the scene information may be represented by a list of modes present in the scene radiation, together with the amplitudes and phases of those modes.

In a preferred embodiment the scene radiation modes and generated modes are combined in a multimode waveguide structure. Preferably, the generated modes are produced by a generator (or mode converter) which is based on injecting two plane waves (or two waves which approximate two perfect plane waves as closely as possible) at suitable angles and with suitable phases into a multimode waveguide.

Alternatively, the mode generation may be achieved by a laser source providing laser radiation to the multimode waveguide structure. In this case the laser source may be frequency locked and frequency offset from another laser which provides for scene illumination.

The radiation field analyzer may be one of several analyzers in a serial or parallel array. Each analyzer may then be arranged for analysis of a given waveguide mode or series of modes. The analyzers may be fed from one tunable mode converter; alternatively each analyzer in the array may have its own mode generator or mode converter.

Preferentially, the radiation field analyzer is provided with a computer system for controlling the modes generated by a tunable mode generator or mode converter and also for analyzing the modal spectrum measured by the analyzer.

In a further aspect, a radiation field analyzer may be arranged as part of a laser radar system.

BRIEF DESCRIPTION OF THE DRAWINGS

In order that the invention might be more fully understood, embodiments thereof will now be described, by way of example only, with reference to the accompanying drawings in which.

DETAILED DISCUSSION OF PREFERRED EMBODIMENTS

Figure 1:
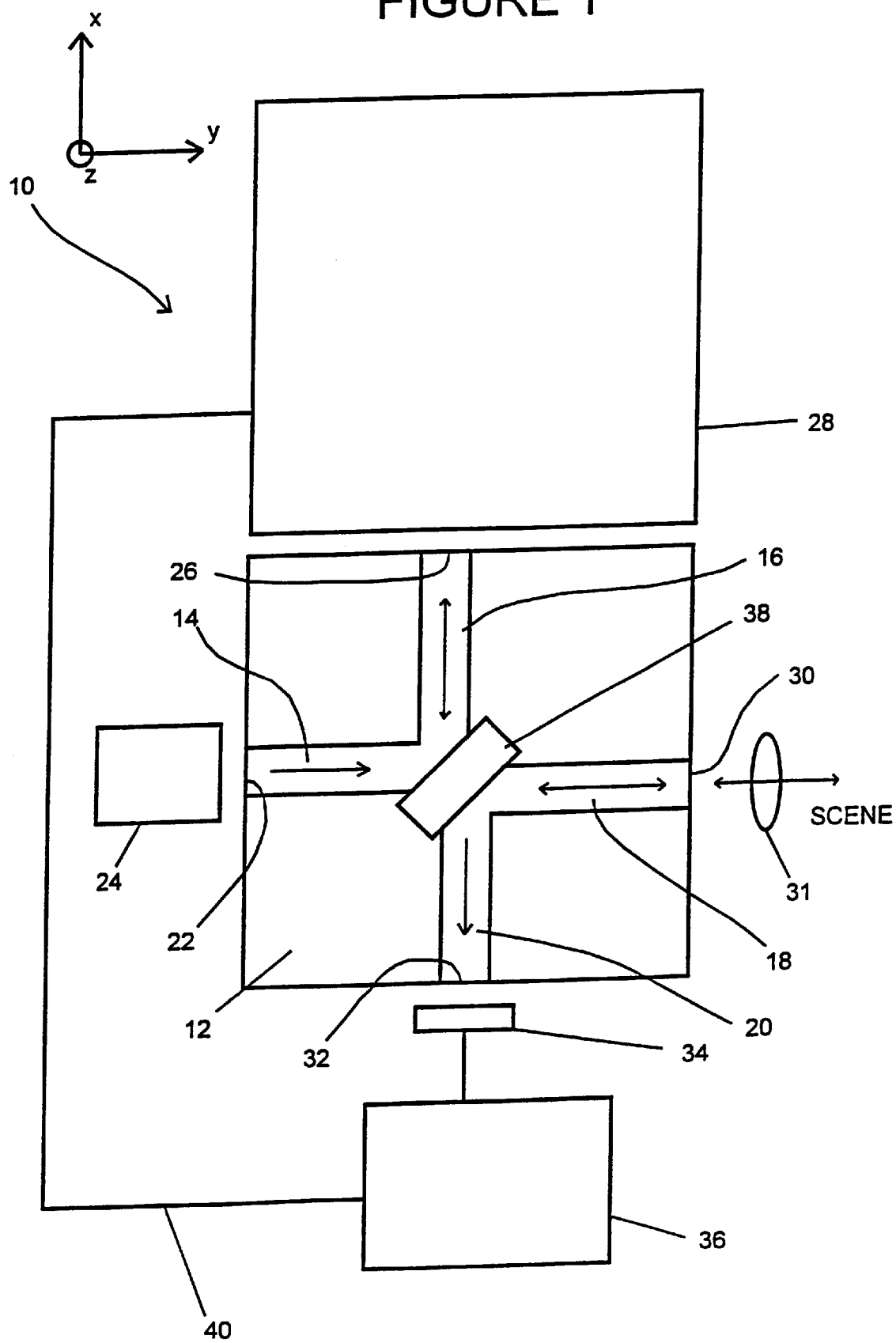
FIG. 1 is a schematic sectional plan view of a radiation field analyzer of the invention.

Referring to FIG. 1, there is shown a schematic view of a radiation field analyzer indicated generally by 10. It incorporates a multimode waveguide structure 12 which has four substantially identical multimode waveguides: a radiation input waveguide 14, a mode conversion waveguide 16, a radiation transmit/receive waveguide 18 and a detector waveguide 20.

The input waveguide 14 has an input aperture 22. A $CO_2$ laser source 24 is arranged to direct radiation onto an input aperture 22. Mode conversion waveguide 16 has an aperture 26. A tunable mode converter 28 is situated at the aperture 26. Mode converter 28 will be described in more detail later. It is arranged to receive fundamental mode radiation from conversion waveguide 16 and convert it to radiation of any one of a number of desired modes. With the radiation in the desired mode it is then transmitted back to the conversion waveguide 16. In addition to converting the radiation to that of a require mode, a phase modulation or frequency offset of the radiation is also generated in the mode converter.

The transmit/receive waveguide 18 has an aperture 30. Radiation from waveguide 18 is coupled to free space modes outside the multimode waveguide structure 12 via the aperture 30 and a lens system 31. Also, radiation in free space modes from external objects is coupled to the transmit/receive waveguide 18 in waveguide modes via the lens system 31 and the aperture 30.

The detector waveguide 20 has an aperture 32. A detector system 34 is arranged to detect radiation emerging from detector waveguide 20 via aperture 32. Detector system 34 is connected to a computer system 36 for recordal and analysis of the radiation emergent from detector waveguide 20.

The multimode waveguide structure 12 incorporates a beam splitter 38 situated at ends of waveguides 14 to 20 opposite to apertures 22, 26, 30 and 32. The beamsplitter 38 is arranged for substantially equal reflection and transmission of incident radiation (i.e., it is a 50:50 beamsplitter). It is arranged for reflection of radiation from input waveguide 14 into conversion waveguide 16 and transmission of radiation from input waveguide 14 into transmit/receive waveguide 18. Similarly, radiation from conversion waveguide 16 is transmitted to detector waveguide 20, and also reflected to input waveguide 14. Also, radiation from transmit/receive waveguide 18 is reflected to detector waveguide 20 and also transmitted to input waveguide 14.

The operation of the radiation field analyzer 10 will now be described in general terms, a more detailed theoretical analysis being given later. Fundamental mode radiation from the laser source 24 is arranged to couple to the input waveguide 18 in the $EH_{11}$ mode, i.e., as fundamental mode radiation. The fundamental mode radiation propagates along the input waveguide 14 to the beamsplitter 38. Substantially 50% of the radiation is transmitted through the beamsplitter 38 to the transmit/receive waveguide 18. The remaining substantially 50% of the radiation is reflected to the conversion waveguide 16. The radiation in both waveguides 16 and 18 propagates in the fundamental mode to respective apertures 26 and 30.

The radiation which emerges from aperture 30 couples essentially to the $TEM_{00}$ free-space radiation mode. It illuminates a scene (not shown) and radiation reflected from the scene is coupled into the transmit/receive waveguide 18, via aperture 30. The radiation couples into a number of waveguide modes, of the form $EH_{mn}$, where m and/or n are greater than or equal to one.

The fundamental mode radiation which emerges from aperture 26 enters the tunable mode converter 28. The converter 28 converts fundamental mode $EH_{11}$ radiation into higher order waveguide modes $EH_{mn}$. The converter 28 carries out the mode conversion by generating modes in a controlled sequence. The converter 28 is controlled by the computer 36, via a control line 40. The converter 28 generates all modes in the range $EH_{11}$ to $EH_{mn}$. At any one particular setting, the mode converter only generates a single mode. With m=n=10 the resolution would be equivalent to a prior art radiation field analyzer having a 10 by 10 array of sub-apertures.

The modes generated by the converter are transmitted to the conversion waveguide 16 via aperture 26. A phase modulator in the mode converter imposes a sinusoidal phase modulation on the generated modes. In one implementation the phase modulator takes the form of a fully reflecting mirror mounted on a piezoelectric stack. The stack is driven by a sinusoidally varying voltage which produces a time dependent axial motion of the mirror of the form $\cos(\omega t)$ where $\omega$ is the drive frequency. The amplitude of the drive voltage is arranged so that the limit of the linear motion is $\lambda/2$ where $\lambda$ is the wavelength of a plane wave in the core of the guide. This motion of the mirror imposed a sinusoidally varying phase shift (0→360°) on the beam reflected from the mirror.

The phase modulated radiation from the tunable mode converter 28 propagates along the conversion waveguide 16 towards the beamsplitter 38. The radiation from the scene or object which is coupled into the transmit/receive waveguide 18 propagates along waveguide 18 towards the beamsplitter 38. The radiation from the converter 28 and the radiation from the scene or object are mixed via the beamsplitter 38 and thence transmitted to the detector 34.

Because of the orthogonality of the waveguide modes the peak-to-peak amplitude of the power variation measured by the detector will only be non-zero when the $EH_{mn}$ mode from the scene or object equates to the $EH_{mn}$ mode generated by the tunable mode converter. For example, when the mode converter 28 generates the $EH_{31}$ mode, there will only be a finite power variation in the transmit/receive waveguide 18 when the radiation from the scene also results in excitation of the mode $EH_{31}$. The resulting sinusoidal variation in the power is recorded by the computer 36 and used to deduce the modulus and phase of the $EH_{31}$ component in the field from the scene. Consequently, from knowledge of the mode settings and the relative amplitudes and phases of the modes generated by the tunable mode converter 28 and of the sinusoidal power measurements made by the detector 34, the complex amplitudes of all the $EH_{mn}$ radiation modes present in the radiation received from the scene can be determined.

This enables the radiation field from a scene to be characterized according to the $EH_{mn}$ modes excited in the transmit/receive waveguide. The higher the order of modes used in the analysis, the greater the resolution by which the scene radiation field can be characterized. Lower order modes may provide information on the bulk characteristics of the scene; for instance the presence of $EH_{21}$ mode, with two intensity peaks, indicates the presence of two main vertical components in the scene. Conversely, higher order modes such as the mode $EH_{10,10}$ provide information about smaller scale detail of the scene. Consequently, scene radiation fields can be characterized in terms of the $EH_{mn}$ modes which it excites. Scene radiation fields may be calibrated; i.e. a known object field may be characterized in terms of the $EH_{mn}$ modes which it produces, and the analyzer 10 may then be arranged to register when the $EH_{mn}$ modes corresponding to that object are received by the detector 34. The analyzer 10 may then be used as the basis of a surveillance system in which objects to be detected by the analyzer 10 are initially calibrated in terms of the $EH_{mn}$ modes which they excite.

Figure 2:
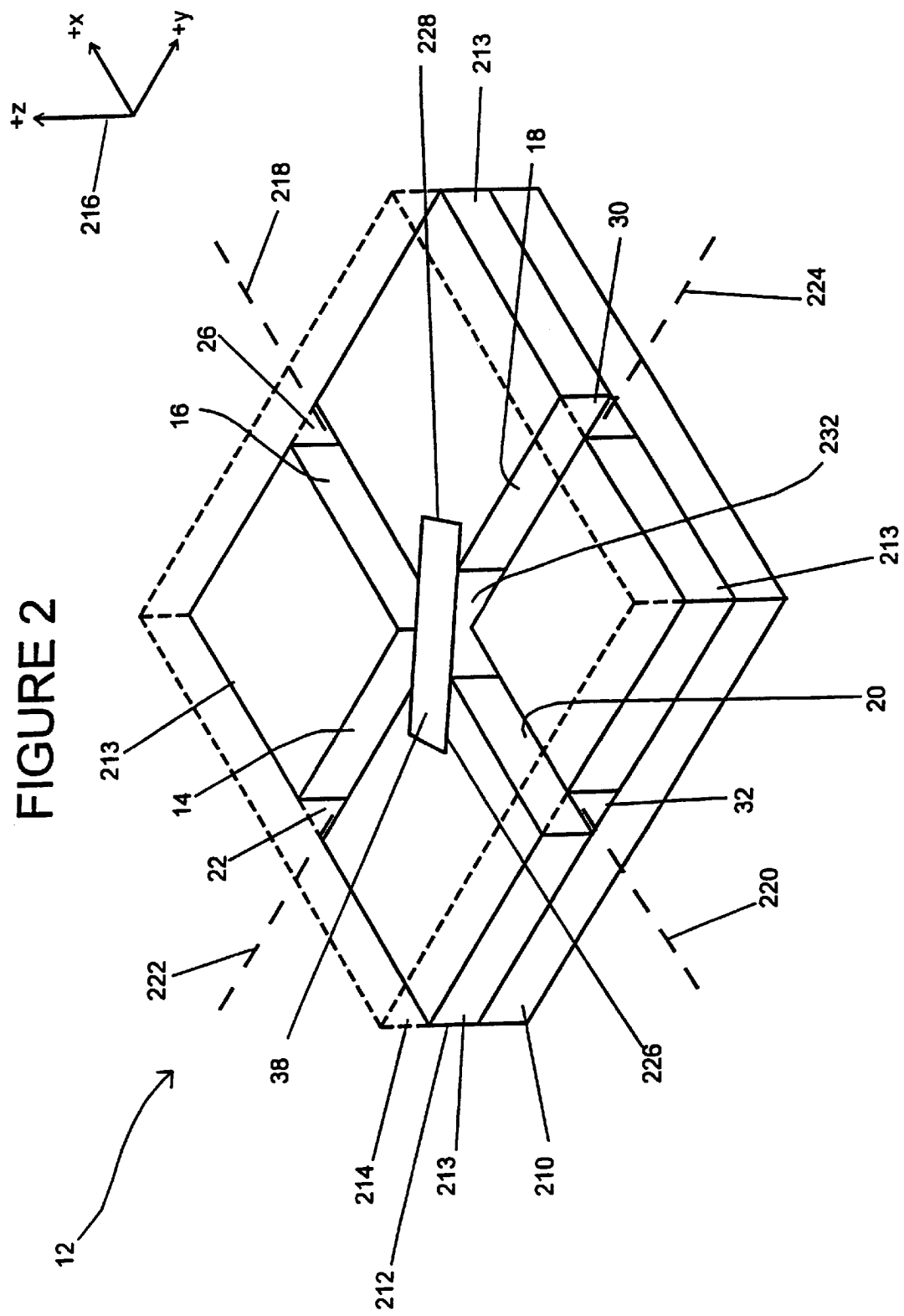
FIG. 2 is a perspective view of a multimode waveguide structure incorporated in the radiation field analyzer of FIG. 1.

FIG. 2 is a perspective view of the multimode waveguide structure 12 of FIG. 1. The multimode waveguide structure 12 is fabricated from alumina. It is composed of three layers: a substrate layer 210 forming the lower walls of the hollow waveguides, a waveguide layer 212 comprising an arrangement of tiles 213 forming the vertical walls of the hollow waveguides, and a top layer 214 indicated by dotted lines and forming the upper walls of the hollow waveguides.

The waveguide layer 212 defines the shape of the input waveguide 14, the mode conversion waveguide 16, the radiation transmit/receive waveguide 18 and the detector waveguide 20 shown in FIG. 1. Each of the resulting hollow waveguides 14 to 20 is of constant square cross-section of side 2a where a is equal to one millimeter.

The dispositions of the waveguides 14 to 20 will now be described with reference to axes 216. The mode conversion waveguide 16 and detector waveguide 20 have respective central longitudinal axes 218 and 220 extending in the x-direction. Axis 220 is offset from axis 218 by 0.93 mm in the positive y-direction. Similarly, input waveguide 14 and transmit/receive waveguide 18 have central longitudinal axes 222 and 224 respectively extending in the y-direction. Axis 222 is offset from axis 224 a by 0.93 mm in the positive x-direction.

The waveguide layer 212 also has two slots 226 and 228. These are situated respectively between waveguides 14 and 20, and waveguides 16 and 18. The beamsplitter 38 is situated in slots 226 and 228 at a common intersection 232 of the waveguides 14 to 20. The beamsplitter is fabricated from zinc selenide and has a thickness of 1.9 mm. A multidielectric coating is evaporated onto its surface allowing 50% of the incident light to be transmitted and 50% reflected.

The waveguides 14 to 20 have respective apertures 22, 26, 30 and 32 at the end of the waveguide layer 212. The laser source 24 is centrally located on longitudinal axis 222. Tunable mode converter 28 is centrally located on axis 218, 1.0 millimeter distant from aperture 26 of conversion waveguide 16. The detector 34 is a cooled 4.0 mm square chip of cadmium mercury telluride (CMT) which is located centrally on axis 220; it is positioned so as to capture all of the radiation emitted from the aperture 32.

Figure 3:
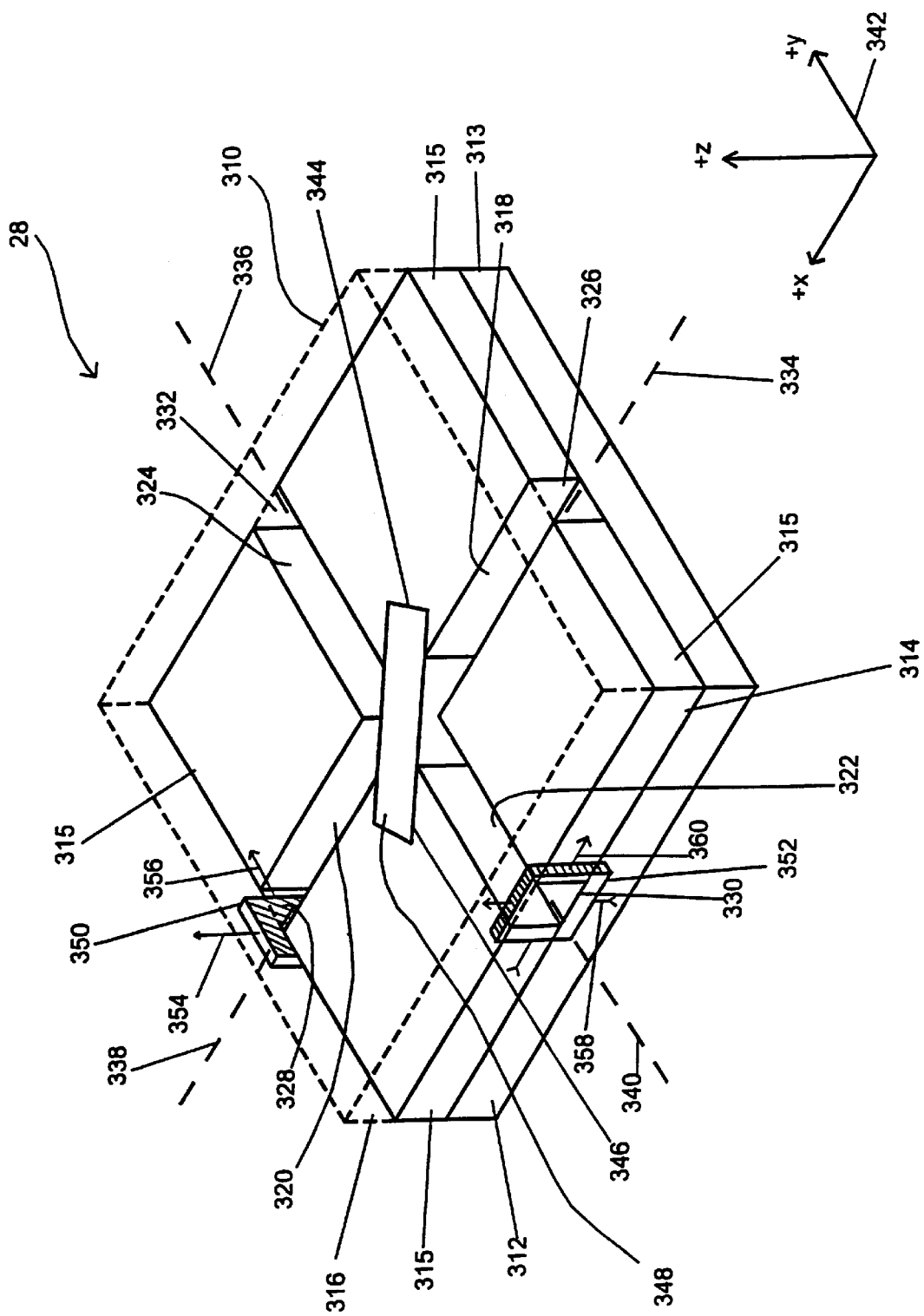
FIG. 3 is a perspective view of a tunable mode converter of the FIG. 1 analyzer.

FIG. 3 shows a perspective view of the tunable mode converter 28 of FIG. 1. It incorporates a multimode waveguide structure 310 comprising four hollow waveguides. The structure 310 comprises three layers 312, 314 and 316. Layer 312 consists of a substrate plate 313 which forms the lower walls of the hollow waveguides, layer 314 comprises an arrangement of tiles 315 which form the vertical walls of the hollow waveguides and layer 316, indicated by dashed lines, is a top plate 317 which forms the upper walls of the hollow waveguides.

The arrangement of tiles 315 forms four multimode waveguides 318, 320, 322 and 324. Waveguide 318 is an input waveguide; waveguide 320 is a first mode conversion waveguide; waveguide 322 is a second mode conversion waveguide; and waveguide 324 is a mode checking waveguide. Each waveguide is of square cross-section of side 2.0 mm. Each waveguide 318 to 324 has a respective aperture 326, 328, 330 and 332 at the corresponding edge of the layer 314.

The waveguides 318 to 324 have corresponding central longitudinal axes 334, 338, 340 and 336. Axis 338 is offset from axis 334 by 0.93 mm in the positive y-direction, as indicated by axes 342. Similarly, axis 336 is offset from axis 340 by 0.93 mm in the positive x-direction. In operation, axis 334 is parallel and coaxial with the axis 218 of FIG. 2.

The layer 314 has two slots 344 and 346, extending throughout its thickness. Slot 334 is situated at the intersection of waveguides 318 and 324; and slot 346 at the intersection of waveguides 320 and 322. The slots 334 and 346 each support a zinc selenide beamsplitter 348, of thickness 1.96 mm.

The first and second mode conversion waveguides 320 and 322 have respective associated mode conversion mirrors 350 and 352. These are located centrally along axis 336 and 338, and a distance of approximately 1.0 mm away from apertures 328 and 330. The mirrors 350 and 352 are mounted on respective motorized mounts (not shown). The mounts enable the mirrors 350 and 352 to be rotated about selected axes. Mirror 350 is rotatable about central axes 354 and 356, which are respectively a vertical axis parallel to the z-direction, and a horizontal axis parallel to the y-direction. Mirror 352 is rotatable about central axes 358 and 360, which are respectively parallel to the z-direction and to the x-direction. Additionally, the separation between mirrors 350 and 352 and their associated waveguide apertures 328 and 330 can be varied by linear motors on the mounts. Movement of the mirrors is controlled by computer 36 of FIG. 1.

The mode converter 28 is located adjacent to the multi-mode waveguide structure 12 such that light from aperture 26 couples into aperture 326 of input waveguide 318 of the converter 28.

The operation of the mode converter 28 will now be described. Fundamental mode radiation entering aperture 326 propagates along input waveguide 318 to beamsplitter 348. As beamsplitter 348 is a 50:50 beamsplitter, essentially half the incident radiation is transmitted through it to the first mode conversion waveguide 320. The substantial part of the remainder is reflected into the second mode conversion waveguide 322. The radiation propagates along waveguides 320 and 322, and emerges from apertures 328 and 330. The radiation is incident on mirrors 350 and 352, and reflected back towards the apertures 328 and 330.

Figure 4:
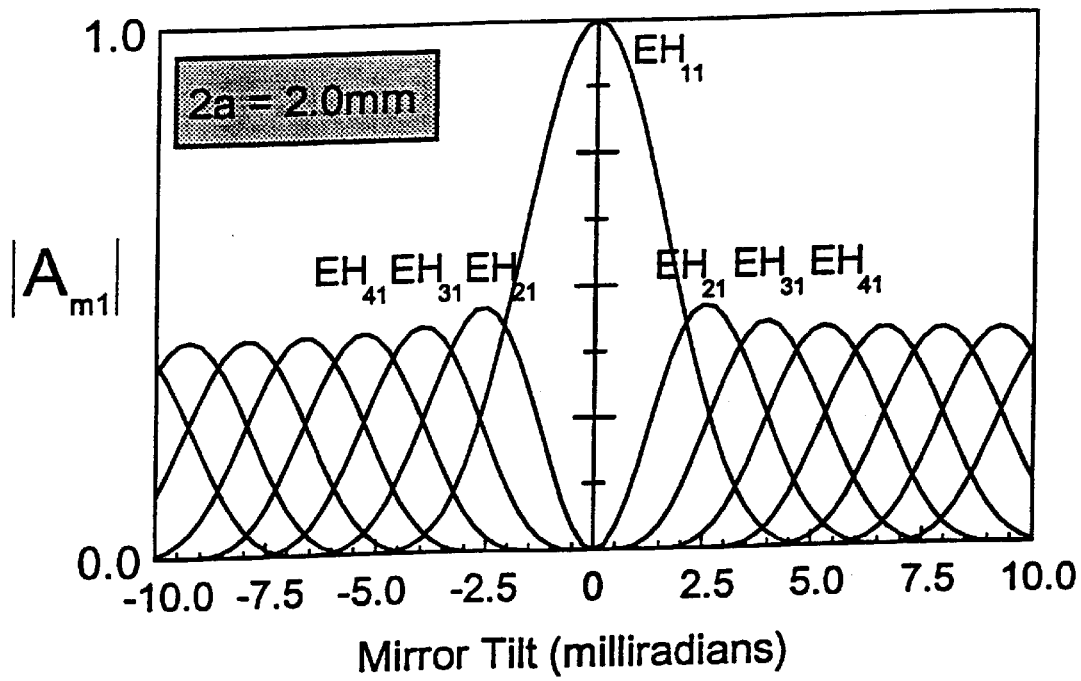
FIG. 4 illustrates radiation coupling to modes of a rectangular waveguide as a function of radiation input direction.

The coupling of the reflected radiation from mirrors 350 and 352 into waveguides 320 and 322 is dependent on the angles of tilt of the mirrors 350 and 352. FIG. 4 shows a graph of the variation of magnitude of the moduli of the modes coupled into the waveguide 320 after reflection from mirror 350. The same graph applies for radiation coupled from mirror 352 to waveguide 322. It can be seen that the moduli of the waveguide modes coupled into the waveguides varies with tilt angle of the respective mirror. Positive tilts relate to clockwise rotations of the mirrors 350 and 352 about respective vertical axes (i.e. z-axes) 358 and 360. Negative tilts refer to anticlockwise rotations. The graph of FIG. 4 is for $EH_{mn}$ modes where n is equal to 1.

From the graph it can be seen that at zero tilt then only $EH_{11}$ radiation mode is coupled to the respective waveguides. However, at increasing positive tilts the modulus of the $EH_{11}$ mode decreases until it becomes substantially zero at 11.0 milliradians tilt. Conversely, the modulus of, the $EH_{21}$ mode increases rapidly at positive tilts, to a maximum of about 2.5 milliradians tilt. The maximum amplitude of the modulus of the mode $EH_{21}$ does not, however, reach a value equivalent to that of the $EH_{11}$ mode; rather it is restricted to about two-thirds of that value.

At higher positive tilts the other higher order modes: $EH_{31}$, $EH_{41}$, $EH_{51}$ etc., also begin to be coupled to the respective waveguides. These modes have maximum amplitudes at about 4.0, 5.5 and 7.0 milliradians of mirror tilt respectively. Their maxima are substantially the same as that of $EH_{21}$ mode. For negative mirror tilts the moduli of all modes are the same as for positive tilts, however their phases are different. The mirror tilt required to maximize the amplitude of any given mode, except $EH_{11}$ (for which the maxima is achieved with zero tilt), can be predicted to a good approximation by the formula: $\theta=m\lambda_c/8a$, where, '$\theta$' is the tilt in radians, 'm' is the mode number of the $EH_{m1}{}^{th}$ mode, '$\lambda_c$' is the wavelength of a plane wave in the core of the guide (in the case of hollow waveguides, the wavelength of a plane wave in free space), and a is the half width of the waveguide. For example, if m=3, $\lambda$=10.6 $\mu$m, and a=1.0 mm, then $\theta$=0.003975 radians, i.e. approximately 4 milliradians in good agreement with the numerical predictions of FIG. 4.

Figure 5:
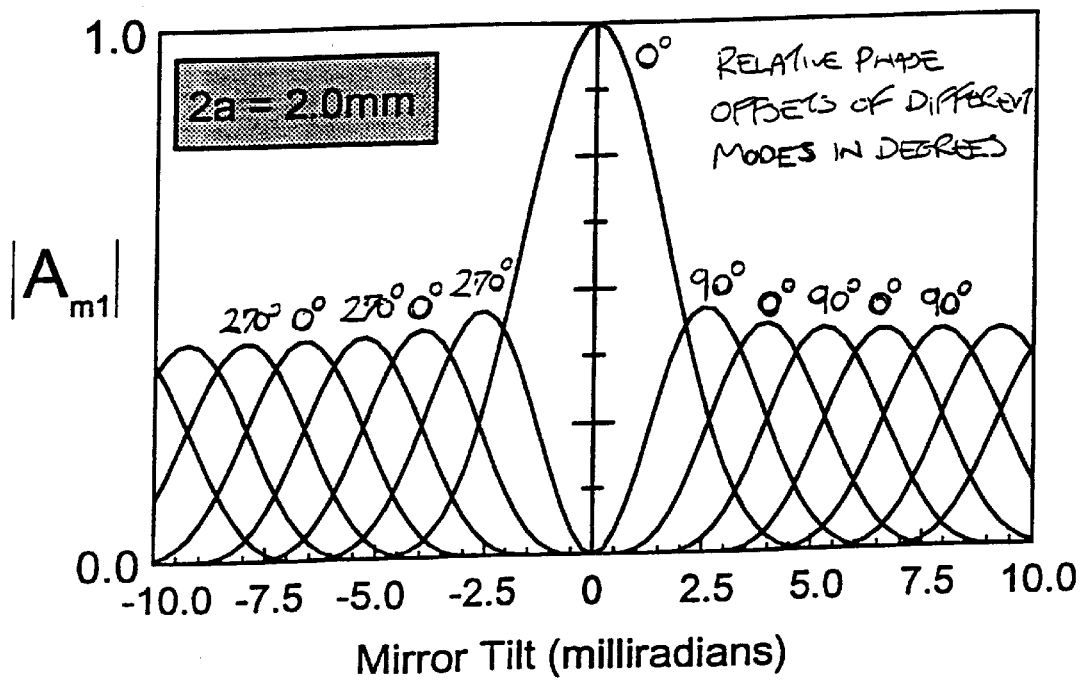
FIG. 5 illustrates relative phase offsets between the modes of FIG. 4.

Whilst FIG. 4 highlights how the moduli of the excited modes varies as a function of mirror tilt FIG. 5 illustrates how, in addition, the phase offsets between the modes are also a function of mirror tilt. It can be seen that for positive mirror tilts the antisymmetric modes $EH_{21}$ and $EH_{41}$ are offset by 90° (or $\pi/2$) from the symmetric modes $EH_{11}$, $EH_{31}$ and $EH_{51}$. Conversely, for negative mirror tilts the antisymmetric modes are offset by 270° ($3\pi/2$).

From FIGS. 4 and 5, it can be seen that for any particular mirror tilt angle a multiplicity of modes are coupled to the respective waveguide. For example, for a positive tilt of 4 milliradians there are contributions from modes $EH_{11}$, $EH_{21}$, $EH_{31}$, $EH_{41}$ and $EH_{51}$. However, the magnitudes of the moduli of the modes are different. The modulus of the fundamental mode is about 0.05, as is that of $EH_{51}$, the moduli of modes $EH_{21}$ and $EH_{41}$ is approximately 0.25, whilst the modulus of $EH_{41}$ is maximized at a value of 0.4.

For the analysis of radiation from a scene by the technique outlined, it is desirable that the mode converter 28 should generate substantially single $EH_{mn}$ modes at any one time. If it generates multiple modes then these may beat with multiple modes from the scene radiation field to be analyzed, causing multiple beat signals. More sophisticated signal processing techniques would then be required in order to determine which modes were present in the radiation detected by detector 34. If single modes could be generated by the mode converter the analysis could be much simpler.

With the aim of generating essentially pure modes, the symmetric and antisymmetric modes may be separated so that approximately only one mode is produced from the mode converter 28 at any one time for any given mirror tilt. The modes are separated by virtue of the coherent mixing process at the beamsplitter 348.

Figure 6:
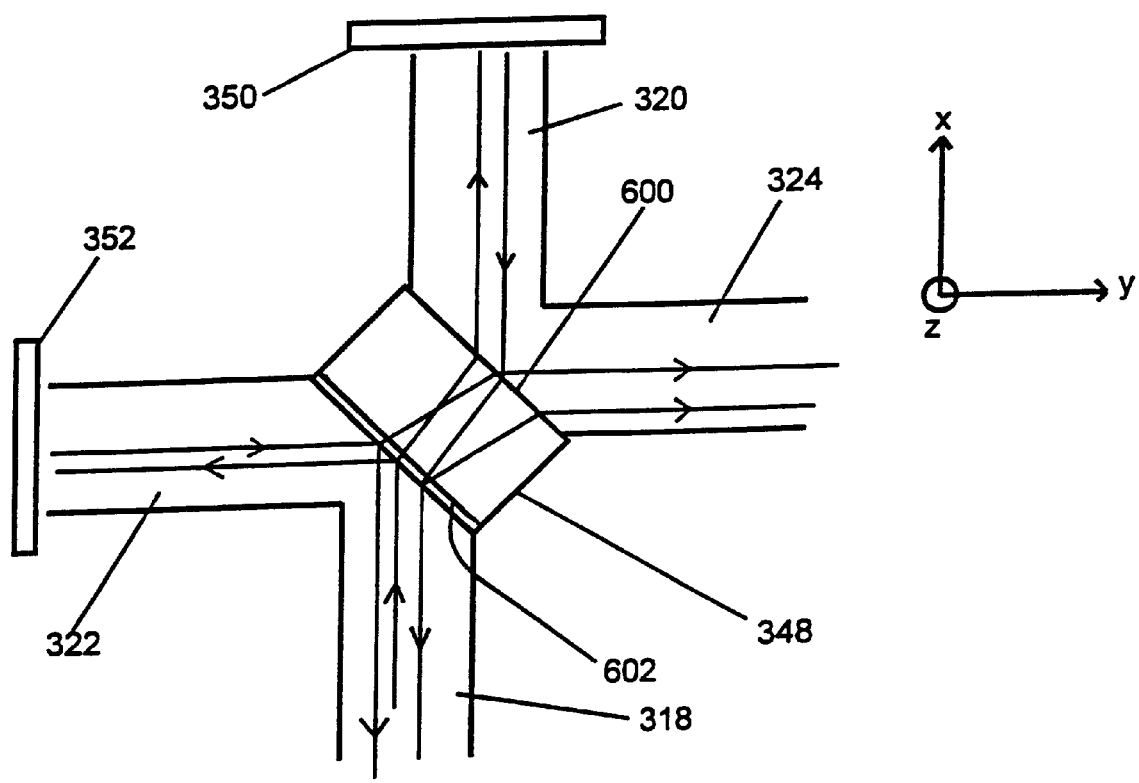
FIG. 6 is a schematic view of radiation propagation through a beam splitter of the radiation field analyzer of FIG. 1.

FIG. 6 shows a schematic view of the propagation of radiation through the beamsplitter. The beamsplitter 348 has two faces 600 and 602. Face 600 has an anti-reflection coating whilst face 602 has a multidielectric coating providing 50% transmission and 50% reflection. Consequently radiation propagating towards the beamsplitter 348 is transmitted through and reflected from the face 602 to waveguides 320 and 322 respectively in equal ratios. The reflection actually occurs at the interface of the high refractive index beamsplitter 348 and low refractive index air adjacent to it. For radiation approaching this interface from mirror 352 the radiation is traveling in a low refractive index medium and is reflected at the air interface with the high refractive index medium of the beamsplitter 348. The radiation undergoing this reflection does not undergo a phase change. Conversely, the radiation approaching the interface from the mirror 350 is traveling in the high index medium of the beam splitter and is reflected from the interface with the lower refractive index medium—i.e. the air surrounding the beamsplitter 348. The radiation undergoing this reflection undergoes a $\pi$ radian, or one hundred and eighty degree phase shift.

Following the coupling of radiation into waveguides 320 and 322, reflection from the mirrors 350 and 352 once again results in radiation being reflected from, and transmitted through, the point 604. Consequently the radiation from the mirrors 350 and 352 can be combined at point 604 and can couple modes into both of the waveguides 318 or 324. For the intensity of a given $EH_{mn}$ mode to be maximized in output waveguide 318 the phase difference between radiation from mirrors 350 and 352, via waveguides 320 and 322 and the at the interface 604, must satisfy the following:

$$\phi_{mn350}-\phi_{mn352}=p2\pi,$$

where p is an integer, $\phi_{mn350}$ is the phase of the $EH_{mn}$ mode injected into waveguide 318 from mirror 350, and $\phi_{mn352}$ is the phase of the same mode injected into waveguide 318 from mirror 352.

In order to achieve this situation for any given mode the mirror 350 is arranged for lateral movement in the x-direction (axial movement along the guide axis) over a distance x. This movement produces a phase change $\phi_c$ in $\phi_{mn350}$, given by:

$$\phi_c = 2x \cdot \frac{2\pi}{\lambda_{mn}},$$

where $\lambda_{mn}$ is the wavelength of the $EH_{mn}$ mode. As the laser source 24 is a $CO_2$ laser, the wavelength of the free space radiation is 10.6 μm. To obtain a phase change $\phi_c$ would require a movement $x=\lambda_{mn}\phi_c/4\pi$. In practice, in order that like modes are in phase, $\phi_c$ would be adjusted so that $(\phi_{mn352}-\phi_{mn350})$ would be an integral multiple of $2\pi$ radians.

From FIG. 5, it can be seen that for positive tilts of mirror 350 about the z-axis (see FIG. 3) the antisymmetric modes $EH_{21}$, $EH_{41}$, $EH_{61}$ etc., are offset by 90° from the symmetric modes, whilst for negative tilts of the mirror 350 about the z-axis the antisymmetric modes $EH_{21}$, $EH_{41}$, $EH_{61}$ etc., are offset by 270° from the symmetric modes. Considering the situation where mirror 350 has a positive tilt, and mirror 352 has a positive tilt (which following reflection from the beamsplitter 348 equates to an effective negative tilt in output guide 318 as far as the relative phases of the modes are concerned), if by the application of an appropriate phase shift, applied via the piezo-electrically controlled displacement of mirror 350 it is arranged that the symmetric modes transmitted by the beamsplitter 348, from mirror 350 into output guide 318, are in phase with the symmetric modes reflected by the beamsplitter 348, from mirror 352 into output guide 318; then these symmetric modes will constructively interfere at point 604, and produced a beam of symmetric modes which will be coupled into waveguide 318. Conversely with the same mirror tilts the transmitted and reflected antisymmetric modes from mirrors 350 and 352 will be out of phase at point 604 and will destructively interfere in the outgoing field of waveguide 318. Simultaneously, these antisymmetric modes will be in phase in the outgoing field of waveguide 324 and will interfere constructively, whilst the symmetric modes in outgoing field of waveguide 324 will be out of phase and will interfere destructively.

Conversely, where the mirror 350 is displaced so as to achieve destructive interference between the symmetric modes in the outgoing field in waveguide 318 the antisymmetric modes will be in phase and will interfere constructively. Simultaneously in waveguide 324 the outgoing symmetric modes will interfere constructively and the antisymmetric modes will be absent.

In the above situation, the mode set which is coupled to waveguide 324 may be used as a check on the modes which are produced in the output field of waveguide 318 i.e. the output from the mode converter 28. For example, if antisymmetric modes are to be output via waveguide 318 then waveguide 324 must contain symmetric modes, and vice versa. The waveguide 324 may have a detector array (not shown) opposite its output aperture 322 for the purpose of analyzing the modes.

The previous argument demonstrates how the output radiation from the mode converter 28 can be selected to be either a symmetric or an antisymmetric mode and how the purity of a given mode can be maximized by choosing the tilt magnitudes on the mirrors 350 and 352 according to the expression $\theta=m\lambda_c/8a$. However, unless the input to the mode converter is a perfect plane wave the output at each of these settings may contain multiple modes and so there will be a further requirement to suppress the effects of unwanted modes. This is achieved as follows.

From the graph of FIG. 4, it can be seen that for zero mirror tilt then the only mode generated in the fundamental mode $EH_{11}$. At 4.0 milliradians of mirror tilt the $EH_{31}$ is the dominant mode produced, but there are also small contributions from $EH_{51}$ and $EH_{11}$ modes. Antisymmetric modes are being ignored here, as these can be eliminated as previously described. By measuring the output of the analyzer with the mode converter 28 set with zero tilt of mirrors 350 and 352 then the amplitude of the fundamental mode $EH_{11}$ can be directly ascertained, as that is the only mode generated at zero tilt.

The amplitude of the $EH_{31}$ mode can be determined by measuring the output from the analyzer with the mirrors in the mode converter set to tilts of +2.5 milliradians. From FIG. 4 the contribution of the $EH_{31}$ and $EH_{11}$ modes are substantially the same and all other symmetric modes have very low magnitudes. The amplitude of the $EH_{11}$ mode at 2.5 milliradians of mirror tilt can be determined from the previous measurement at zero tilt. From the graph of FIG. 4 the amplitude of the $EH_{11}$ mode varies with mirror tilt in a known manner, and the amplitude at any tilt can then be found from the amplitude at zero tilt. As the $EH_{11}$ amplitude at 2.5 milliradians is known the contribution to the $EH_{31}$ mode signal can be deduced. Similarly, at 5.5 milliradians of mirror tilt the amplitude of the $EH_{51}$ mode can be determined, from knowledge of the previously determined $EH_{11}$ and $EH_{31}$ modes and of the output of the analyzer with the mirrors in the mode converter 28 set to this mirror tilt.

Similarly, from FIG. 4, when the antisymmetric modes are selected by appropriate setting of the PZT the amplitude of the $EH_{21}$ mode can be found by measuring the output from the analyzer when the mirrors in the mode converter are set at +1.5 milliradians of tilt. Here, the mode converter output is mostly due to the $EH_{21}$ mode, with $EH_{41}$ having only a small contribution. At +4.0 milliradians the contributions from $EH_{21}$ and $EH_{41}$ are the same with the amplitudes of all other antisymmetric modes being extremely small. By measuring the output from the analyzer in this situation and compensating for the contribution of the $EH_{21}$ mode the amplitude (i.e. modulus) of the $EH_{41}$ mode can be deduced.

From the foregoing, it can be seen that the scene radiation field received by the analyzer can be characterized in terms of the individual modes present, by arranging for only symmetric or antisymmetric modes to be produced and by a knowledge of the modes generated at various tilt angles or mirrors 350 and 352.

The foregoing has been concerned with the generation of $EH_{m1}$ modes. This is achieved by tilting mirrors 350 and 352 about their vertical axes and in the same sense. The $EH_{1n}$ modes can be generated by rotating mirrors 350 and 352 about their horizontal (y or x) axes and in the same direction (the requirement for the rotations to be of the same sense arise from the fact that the reflection from the beam splitter inverts the image). The resultant mode graphs are substantially identical to those of FIGS. 4 and 5, but with the "n" numbers varying whilst the "m" number is fixed at 1.

Higher order modes with both m and n greater than 1 can also be generated by the mode converter 28. This can be achieved simultaneously titling the mirrors 350 and 352 about both their horizontal and vertical axes. The $EH_{mn}^{th}$ mode is obtained by tilting the mirrors 350 and 352 to the required tilt about the vertical axis for the $m^{th}$ mode, as was done in relation to FIG. 4, and about the horizontal axis for the appropriate tilt for $n^{th}$ mode. For these higher order modes, the mirrors 350 and 352 must be tilted about their horizontal axes with opposite senses, whilst the tilts about their vertical axes should have the same sense.

Figure 7A:
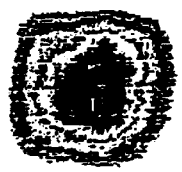
FIGS. 7a and 7b are a series of illustrations of waveguide modes produced by the FIG. 3 mode converter.
Figure 7A:
Figure 7A:
Figure 7A:
Figure 7A:
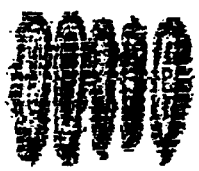
Figure 7A:
Figure 7A:
Figure 7A:
Figure 7A:
Figure 7A:
Figure 7B:
Figure 7B:
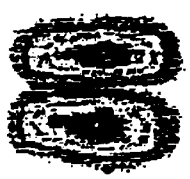
Figure 7B:
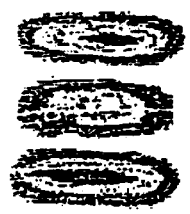
Figure 7B:
Figure 7B:
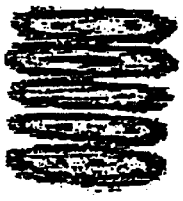
Figure 7B:
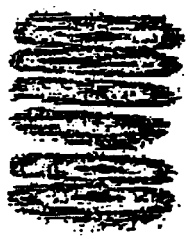
Figure 7B:
Figure 7B:
Figure 7B:
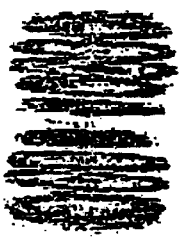
Figure 7B:

FIGS. 7a and 7b are illustrations of the mode outputs produced by the mode converter 28 at differing settings. FIG. 7a shows the radiation intensity patterns output from waveguide 316 when the mode converter 28 was set to produce modes $EH_{11}$ up to $EH_{10,1}$. For example, the $EH_{41}$ intensity pattern has a horizontal row of four intensity peaks. FIG. 7b shows the radiation patterns output from the waveguide 316 when the mode converter 28 was set to produce modes $EH_{11}$ up to $EH_{1,10}$. As an example, the $EH_{17}$ pattern has a vertical column of seven intensity peaks. The fundamental mode $EH_{11}$ consists of a single central intensity peak. In general, intermediate mode patterns have various combinations of columns and rows of intensity peaks. The $EH_{mn}^{th}$ mode has m×n intensity peaks.

Figure 8:
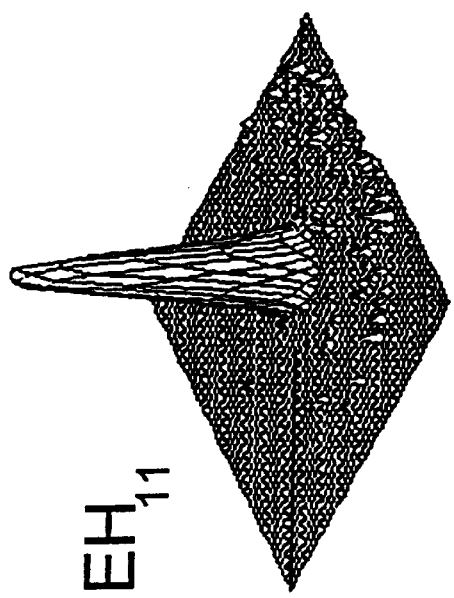
FIG. 8 shows profiles of radiation modes produced by the FIG. 3 mode converter.
Figure 8:
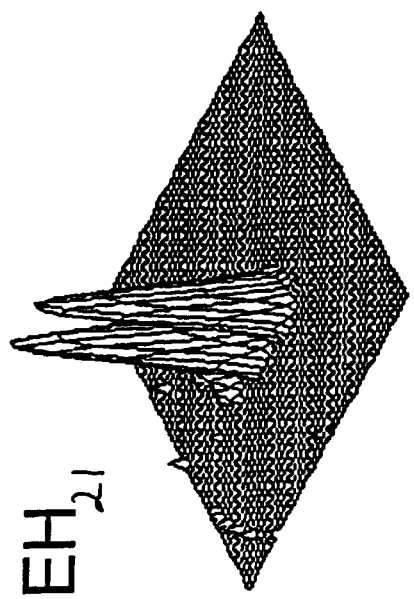
Figure 8:
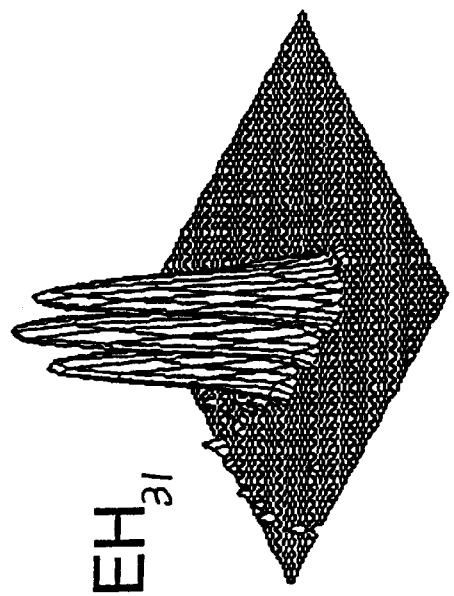
Figure 8:
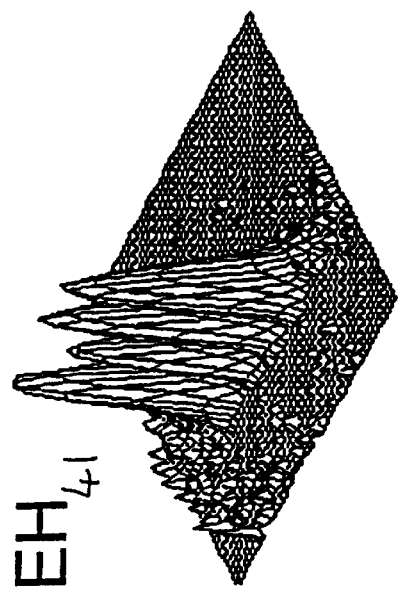

FIG. 8 shows quasi three dimensional profiles of four of the modes produced by the mode converter 28, the modes being $EH_{11}$, $EH_{21}$, $EH_{31}$, and $EH_{41}$. It can be seen that these modes have respectively, one, two, three and four, intensity peaks.

The radiation from the mode converter 28 couples into the conversion waveguide 16 via aperture 26. The multimode radiation from the scene couples into the transmit/receive waveguide 18 via aperture 30. The radiation in the respective conversion waveguide 16 and transmit/receive waveguide 18 propagates towards the 50:50 beamsplitter 38.

The radiation from the scene is composed of a linear combination of $EH_{pq}$ modes with respective complex amplitude $A_{pq}\exp(i\phi_{pq})$. The $EH_{pq}$ modes are produced by an input optical field, $E_{input}$, coupling to the waveguide 18 at aperture 26. Consequently, $E_{input}$ can be represented by the $E_{pq}$ modes as $$E_{input} = \Sigma A_{pq} \exp(i\phi_{pq})EH_{pq}$$

Essentially, the waveguide 18 carries out a Fourier analysis of the optical field $E_{input}$ at its entrance aperture 26. The complex amplitudes are then the coefficients of the Fourier series and the modes excited in the waveguide 18 are a modal representation of the field from the scene.

The radiation modes in waveguides 16 and 18 are now mixed together at the beamsplitter 38. By moving the mirrors 350 and 352 of the mode converter simultaneously through a sinusoidally varying displacement of maximum amplitude, Y, for each $EH_{rs}$ setting of the mode converter a beat signal is produced on the detector. A displacement of at least 2.65 μm, brought about by the application of a sinusoidally varying voltage being applied to the piezo-electric transducers, is necessary in order to ensure that the phase of the $EH_{rs}$ mode from the converter changes by π radians.

The coherent beating of an $EH_{rs}$ mode from the converter and the mode spectrum from the scene results in a beat field which is propagated along the detector waveguide 20. It emerges from aperture 32 and is detected at detector 34. Under these conditions, the time varying 2D intensity profile produced on the detector 34 is given by:

$$I_b(x, y, t) = \left[\frac{A_{pq}}{\sqrt{2}}EH_{pq}\right]^2 + \left[\frac{A_{rs}}{\sqrt{2}}EH_{rs}\right]^2 + \frac{A_{pq}}{\sqrt{2}}EH_{pq}\frac{A_{rs}}{\sqrt{2}}EH_{rs}\cos(\omega t + \rho)$$

Here, $A_{pq}$ and $A_{rs}$ are the moduli of the complex amplitudes of the modes in the scene field and those produced by the mode generator, respectively, and ρ is the difference of their arguments, $(\rho_{pq}-\rho_{rs})$, i.e. their phase difference. By integrating over the waveguide cross-section the time variable component of the power falling onto a detector which captures all the radiation emanating from the guide, is given as:

$$P_b = 2\frac{A_{pq}}{\sqrt{2}}\frac{A_{rs}}{\sqrt{2}}\cos(\omega t + \rho)\int_{-a}^{+a}\int_{-b}^{+b}EH_{pq}(x,y)EH_{rs}(x,y)dx\,dy$$

and the peak-to-peak value of $P_b$ as:

$$P_{b_{pk-pk}} = 4\frac{A_{pq}}{\sqrt{2}}\frac{A_{rs}}{\sqrt{2}}\int_{-a}^{+a}\int_{-b}^{+b}EH_{pq}(x,y)EH_{rs}(x,y)dx\,dy$$

Because of the orthogonal nature of the waveguide modes the integral term and hence the peak-to-peak amplitude of $P_b$ will only be non-zero when the modes are of the same order, i.e., p=r and q=s, simultaneously. Under this condition the value of the peak-to-peak amplitude of $P_b$ coupled with a knowledge of the magnitude of $A_{rs}$, allows direct evaluation of, $A_{pq}$, the modulus of the complex amplitude of the mode $EH_{pq}$. Furthermore, by making comparative measurements of the relative phase offsets between the sinusoidal variation of $P_b$ and the piezo-electric modulator drive signal, for different mode settings of the mode tunable local oscillator, the relative phase differences between the modes can also be established. In this manner the complex amplitude of each mode in the input field can be measured hence the complete form of the field can be deduced.

In practice, the accurate measurement of the relative phases of the modes in the input field is based on two important assumptions.

(i) That the waveguide optical path length between the entrance aperture of the waveguide (into which the field which is to be analyzed is imaged) and the detector is equal to the waveguide optical path length between the output from the mode converter and the detector. If this were not the case, corrections would have to be made to the measurements based on the mode dispersion equation.

(ii) That the individual modes produced at the output plane of the mode converter all have the same relative phase. If this were not the case the relative phase offsets would have to be established in an initial set-up procedure. This could be based on the injection of a known input field, e.g., the $EH_{11}$ field returned from a tilted mirror. The values of the phase offsets deduced in this manner could either be used to correct the measured data in the computational phase of the field analysis process. Alternatively the phase offset data could be used to establish zero phase offsets between the generated modes by applying suitable d.c. offset voltage levels to the phase modulator in the mode converter for each mode generated. This process is analogous to the "phase up" procedure which has to be undertaken in phased array receivers in order to ensure that the phases of the local oscillator signals applied to the mixing points behind each subaperture are the same.

The analyzer 10 may be calibrated before use by locating a target mirror (not shown) at the aperture 30 of transmit/receive waveguide 18. The mirror can be tilted to generate the modes analogous to those of FIG. 4. Consequently the relative phases of the modes propagating in waveguide 18 can be deduced from the output of detector 34, by beating the $EH_{mn}$ modes from the converter 28 with the modes generated by the target mirror. The amplitude and phase of the modes generated by the converter 28 are known, and the amplitude of modes generated by the target mirror are also known. This enables the relative mode phases to be deduced.

A calibration procedure which would take account of phase offsets between the modes generated by the mode converter is now considered in more detail. With reference to FIG. 1, consider the situation where a target mirror placed at the aperture 30 is tilted by −4.0 milliradians about the z-axis. From FIG. 4, it is known that this results in excitation of modes $EH_{11}$, $EH_{21}$, $EH_{31}$, $EH_{41}$, and $EH_{51}$. The mode converter is tuned to $EH_{11}$ and the phase difference, $\chi_1$, between a sample of the drive signal applied to the phase modulator in the mode converter and the output from the detector is measured. In practice, this could be done with an oscilloscope. The mode converter is then tuned to provide the mode $EH_2$ and the phase difference measurement is repeated. The result this time is a value $\chi_2$. From FIG. 5, it is known that $\chi_2-\chi_1$ should equal 270°, the correction to $\chi_2$ is defined as $\chi_{2c}$, and evaluate it such that $\chi_2+\chi_{2c}-\chi_1=270°$. The value of $\chi_{2c}$ is recorded. In an analogous manner, the phase corrections for the other modes excited by this value of tilt magnitude are evaluated. The target mirror is now tilted by −9.0 milliradians, this results in excitation of modes $EH_{51}$, $EH_{61}$, $EH_{71}$, $EH_{81}$, and $EH_{91}$. This value of tilt was chosen to include $EH_{51}$ which occurred in the first data set. Measurements of the relative phase offsets with respect to $EH_{11}$ from the initial set of measurements which included $EH_{11}$ and $EH_{51}$. The strategy of overlapping the sets of modes for which measurements are made is important because in moving from one value of mirror tilt to another, unless the axis of rotation runs exactly through the waveguide axis, which is unlikely in practice, an axial shift of the mirror surface is also effected which introduces and additional unknown phase shift.

Tilts of the target mirror about the orthogonal x-axis and compound tilts about both the horizontal and vertical axes allow access to a large mode spectrum. In this context, as described earlier, the value of mirror tilt required to excite a given set of modes is to a good approximation given by, $\theta=n\lambda/8a$, where, n is the number related to the mode at the center of the set and, a, is the half width of the waveguide. For example if it is desirable for $EH_{31}$ to be the center of the set then n=3, and with $\lambda=10.6$ $\mu$m and a=1.0 mm, this gives $\theta=4$ milliradians as used earlier. If it is desirable for mode $EH_{33}$ to be at the center of the set excited, the mirror would be tilted by 4.0 milliradians about both the x and z axes. With a computer controlled mirror mount and suitable interface electronics the whole set-up process could be automated.

If it were desirable to analyze the tilted input field at any value of tilt magnitude illustrated in FIG. 4 then a mode tunable local oscillator would be needed which would at least produce modes $EH_{11}$ to $EH_{51}$. It would then be necessary to make moduli and phase measurements for each of the five modes in turn. Because of the unique nature of the input field it is interesting to note that any point in the range the maximum number of modes simultaneously excited is, five. Images of real objects are likely to result in much more complex mode spectra in terms of both the numbers and orders of the modes excited. The resolution with which such images could be analyzed will depend on a number of factors, these include:

(i) the highest order mode accessible with the mode tunable local oscillator,
 (ii) the purity of the modes it produces, and
 (iii) the accuracy with which the modal amplitude and phase measurements can be made. With temporally varying fields another important factor will be the time taken for the measurement to be made. This will depend on the number of modes the analysis is made with and the time taken for each measurement. The latter will itself depend on how quickly the peak-to-peak value of $P_b$ can be evaluated and this in turn will be a function of the phase modulation frequency. Signal to noise issues are also likely to effect overall measurement resolution and time.

Because the approach to field analysis described is reliant on performing sequential measurements on each of the modes that the local oscillator can be tuned through, although potentially very fast, it is inherently slower than a phased array which in principle is real time. However, the mode analysis approach has significant technological advantages over the phased array in that it only requires a single aperture and a single detector to form a very sophisticated coherent field measuring system. As such it might well be possible to upgrade existing single aperture, single detector systems, with the addition of a mode tunable local oscillator. Additionally, the fact that the complex mode amplitude outputs from the system provide a direct Fourier transform of the object field, could have significant advantages as far as image processing, pattern recognition and data storage are concerned. In the context of increasing the speed of measurements it is possible to conceive systems where several local oscillators running on different modes are used to make simultaneous measurements of the different spatial components of a field. In relation to phased array systems the modal analysis approach might also be used to provide improved resolution behind each sub-aperture. Hybrid systems based on a combination of phased array and modal analysis techniques might lead to new approaches to coherent receiver design.

Figure 9:
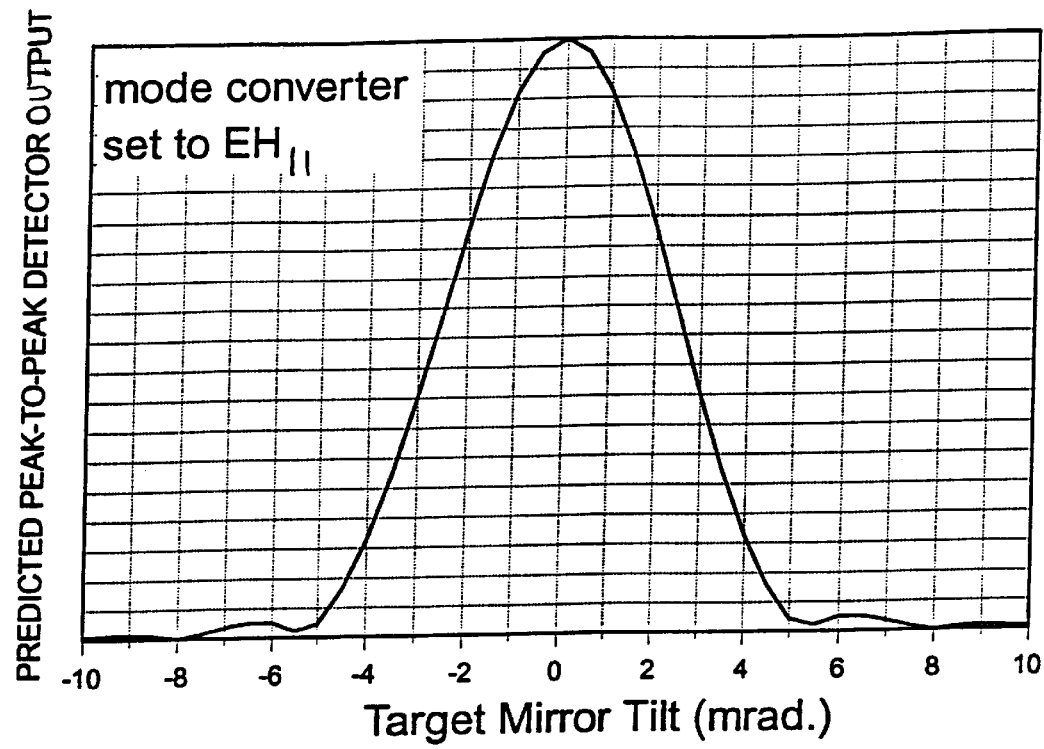
FIGS. 9 and 10 show theoretical predictions of the performance of the FIG. 1 radiation field analyzer.
Figure 10:
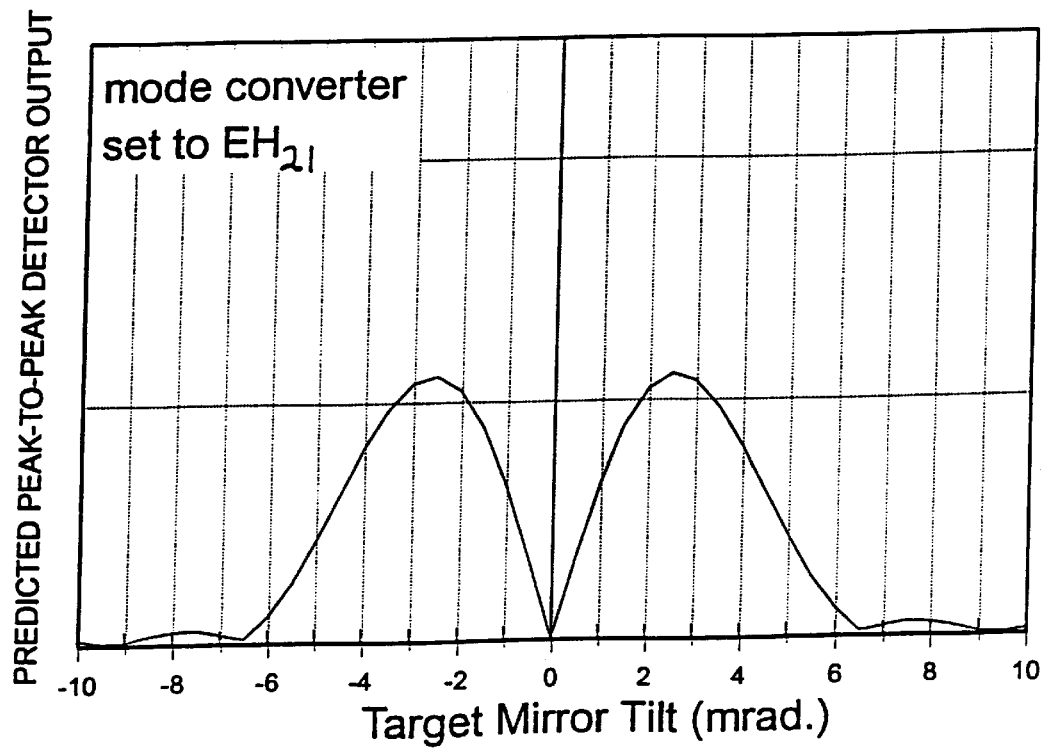
Figure 11:
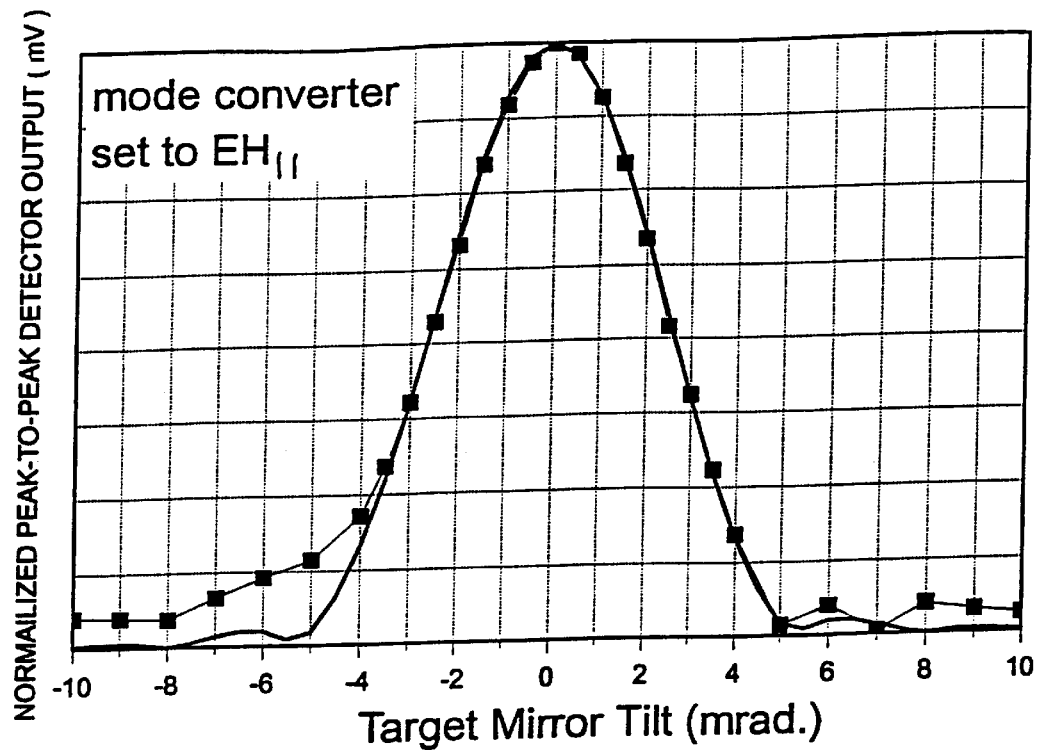
FIG. 11 is an experimental measurement of the theoretical result illustrated in FIG. 9.
Figure 12:
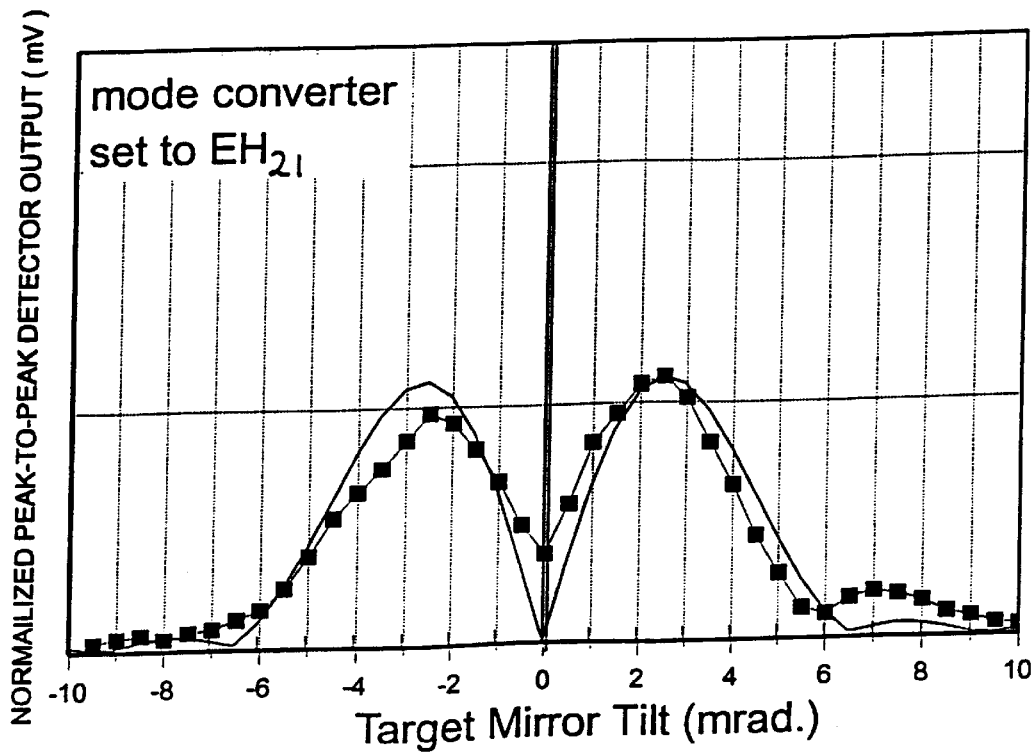
FIG. 12 is an experimental measurement of the theoretical result illustrated in FIG. 10.

FIGS. 9 and 10 show predictions of the way in which the peak-to-peak amplitude of the beat signal received by the detector 34 would vary if the scene was itself a mirror placed at the exit of waveguide 18 and was tilted from −10 milliradians to +10 milliradians. FIG. 9 relates to the case where the mode converter was set to produce the fundamental $EH_{11}$ mode, whilst in FIG. 10 the mode converter is set to generate the mode $EH_{12}$. It can be seen that signal maxima are recorded at the target mirror tilt angles which maximize the coupling to the mode which the mode converter is tuned to. FIGS. 11 and 12 illustrate comparisons of the theoretical predictions illustrated in FIGS. 9 and 10 with experimentally generated results for the case where the mode converter is tuned to $EH_{1f}$ and $EH_{21}$ respectively.

Different designs of mode converter based on multimode waveguides are possible. Essentially, the mode converter design described herein is a multimode waveguide version of the Michelson interferometer. The interferometer serves the purpose of allowing the fundamental mode input field to be split into two components which are then given appropriate tilt magnitudes of opposite senses, before being recombined. A multimode waveguide version of the Mach-Zehnder interferometer could provide a similar function. In the Michelson and Mach-Zehnder versions of the mode converter, improved mode purity can be achieved by increasing the waist size of the $TEM_{00}$ input beam. The generated modes would be perfect if the input field was a plane wave. However, in the case of $TEM_{00}$ input fields where the input beam waist, w, is greater than 0.7a, the waveguide optical path length between the input plane and the fully reflecting tiltable mirrors must be an integer multiple of the length of multimode waveguide required to provide input field regeneration. This length of multimode waveguide is given as, $L=(2a)^2/\lambda$, for a hollow dielectric waveguide.

The most general implementation of the mode generation process is achieved by launching two plane wave beams of opposite tilts and with an appropriate phase offset between them into a multimode waveguide. The waveguide could be of zero length, i.e., an aperture. The tilted beams may be produced by acousto-optic or electro-optic modulators. In these embodiments, the processes of scene illumination, mode generation and field analysis could be simplified if they were to be performed independently. In such embodiments, the output from a laser source could be split into major and minor components. The major component would be used to illuminate the scene whilst the minor component would act as the input to a mode generator. The output from the mode generator would then be mixed with the field returned from the scene in a separate multimode interferometer such that the mode analysis could be performed.

Other ways of generating the required spectrum of mode for the mode tunable local oscillator are also possible. For example, the tunable mode converter 28 may be replaced by a waveguide laser with a square cross section providing controllable multimode output. Higher order modes can be generated by varying the way in which the gain medium is pumped, by tilting the resonator mirrors, by varying the cavity length and by placing a moveable grid of wires over the resonator mirrors. In this configuration, a separate laser source 24 operating on the fundamental quasi-Gaussian mode would be used to illuminate the scene. If the laser source 24 and the mode tunable laser are stabilized in order to prevent relative drift in their frequencies, they could be frequency offset with respect to one another in order to generate a know high frequency beat signal. The fact that the different laser modes of the mode tunable laser will have different oscillation frequencies will also mean that the mode that the mode tunable laser is running on can be identified from the beat frequency. This could be used as a discriminant in order to lock the mode tunable laser to a given mode. For example, if the mode output of the laser changed as a function of the voltage applied to a piezoelectric cavity length controller, an electronic feedback circuit could be designed to keep the cavity length at a value that produced a given beat frequency and hence a given transverse mode.

The concept has been described in the context of mixing the modes generated by the mode generator/converter together with the field to be analyzed in a multimode waveguide structure and then detecting the resultant field on a detector placed at the exit of the multimode waveguide. The mixing process need not be undertaken in a multimode waveguide. Mixing could be arranged to occur on a multi-dielectric etalon mounted in free space with the resultant field detected on the face of a detector mounted in free space. In order for this embodiment to operate correctly, the modes generated in the mode converter/generator would need to be accurately imaged onto the detector. In order to understand this embodiment, it is useful to think of the detector as a multimode waveguide of zero length.

The embodiments described so far have only considered field analysis in the context of the orthogonal modes of square sectioned waveguides. Analysis could be undertaken with the more general class of modes of rectangular sectioned waveguides or the Bessel modes of circular cross sectioned waveguides. Any waveguide which supports a power orthogonal set of modes could be used as the basis of an analyzer.

The embodiments described so far have only considered field analysis in the context of power orthogonal waveguide modes. Analysis can be undertaken in terms of any set of power orthogonal optical field functions which can be generated. These could be the Hermite-Gaussian modes defined in relation to a rectangular coordinate free space system, or the Laguerre-Gaussian modes of a cylindrical coordinate free space system. In these implementations, the lateral extent of the modes varies with their order. The higher the order of the mode the larger its width. In this case, the detector would need to be large enough to capture the highest order mode that was required for the analysis. This differs from the waveguide mode implementations were the lateral extent of all modes is defined by the waveguide cross section.

The embodiments described so far have only considered field analysis where the analysis process is undertaken in a multimode waveguide or free space version of the widely used Michelson interferometer. Other forms of interferometer can be used to perform the field analysis process, including both multimode waveguide and free space versions of the Mach-Zehnder interferometer. The use of Mach-Zehnder type interferometers solely based on multimode waveguides is also possible. Here, a suitably design multimode waveguide takes the place of the etalon in the embodiment described herein. The resulting all-waveguide interferometer has two multimode input waveguides to carry: (i) the field to be analyzed, and, (ii) the output from the mode converter/generator. These input guides feed into another wider multimode waveguide section which provides the mixing function. The resultant fields of the mixing process are carried out in two multimode output guides. A detector placed at the exit of one would be used to make the beat measurements. The all-waveguide form of interferometer could also be used as the basis of a mode generator/converter. In integrated optic implementations of the all-waveguide mode generator/converter electro-optic phase modulators or SAW devices could be used to generate the linear phase shifts produced by the tilted mirrors in the embodiment described in detail herein. Such modulators could also be used to provide a frequency offset between the output from the mode converter and the scene field to be analyzed.

The analyzer 10 may be incorporated in an array of like analyzers. The array may be arranged to receive reflected radiation from a scene. Each individual analyzer such as 10 may be arranged to generate a set of modes in its mode converter such as 28. For example, the analyzer 10 may be arranged to detect modes $EH_{11}$ to $EH_{10}$, whereas a second analyzer may be arranged to detect modes $EH_{21}$ to $EH_{2,10}$ etc. This enables more rapid analysis of modes reflected from a scene. Such an application may be particularly useful for surveillance work, where the nature of a scene must be analyzed rapidly.

An array of analyzers in which each was arranged to detect a full spectrum of modes, could also act as an alternative form of phased array receiver. In this arrangement, the field resolution at any sub-aperture, and hence the resolution of the complete array, would be significantly better than that achievable with a conventional phased receiver array based on the sole use of fundamental mode local oscillators at each sub-aperture.

In the multimode waveguide embodiments of the concept described so far, the multimode waveguides have been hollow in nature and have cross sections of millimeters. In such waveguides, there is an air core surrounded by a dielectric cladding. For 10.6 $\mu$m radiation from a $CO_2$ laser source, polycrystalline alumina is a good cladding material in terms of creating low loss waveguides because of its appropriate complex refractive index properties (i.e. n<1 at 10.6 $\mu$m). When using such dielectric materials, the hollow multimode waveguide structure may be fabricated from a series of plates of the dielectric material. Alternatively, it may be formed from a block of the dielectric material, with the waveguides being etched or machined into the block.

The multimode waveguides need not be hollow waveguides, they can be solid core waveguides with a solid cladding. In such waveguides, the refractive index ratios between the core and cladding are arranged to as to allow the waveguide to support many modes. GaAs/AlGaAs waveguides can be designed to be multimode. The waveguide structures are etched into a suitably designed epitaxial layer using ion beam assisted etching techniques. GaAs/AlGaAs waveguides of a few micrometers cross section can be designed to support many modes. In this context, it is interesting to note that, as the field resolution achieved with the analyzer concept described herein is dependent on the highest order mode that a measurement can be undertaken for, and not the lateral extent of the detector used to make the measurement; systems based on small dimension waveguides which support a good spectrum of higher order modes could provide very high resolution field analysis capabilities. Such analyzers could be useful for coherent microscopy, and could also be very useful for making field measurements at points in the electromagnetic spectrum where small dimension detector arrays are not available.

In the embodiments described so far, the radiation has been 10.6 $\mu$m radiation from a $CO_2$ laser source. In principle with the right optical/waveguide technologies and laser/maser sources, the underlying concepts are applicable across the electromagnetic spectrum.

Implementation of the underlying concepts need not be solely based on the use of laser sources. Narrow linewidth quasi-coherent light sources can be used as an alternative to a laser. In this context, light from distant astronomical objects can also be analyzed in a suitable implementation of the analyzer. In such an implementation, there would be two receiver apertures. The received light from one would be modally filtered in order to provide a fundamental mode input for the mode converter. The output from the mode converter would be mixed with the field received from the other aperture. As the fundamental mode content of the input to the mode converter would vary due to variations in the fundamental mode component of the received field, this would have to be monitored and used to apply a suitable correction to mode amplitude measurements.

In a further embodiment, an analyzer can be arranged to act as a transmitter. By suitable control of the relative mode amplitudes and phases at the outputs of the analyzer, a transmitted beam can be produced from a suitable sum of independently generated $EH_{mn}$ modes.

Figure 13:
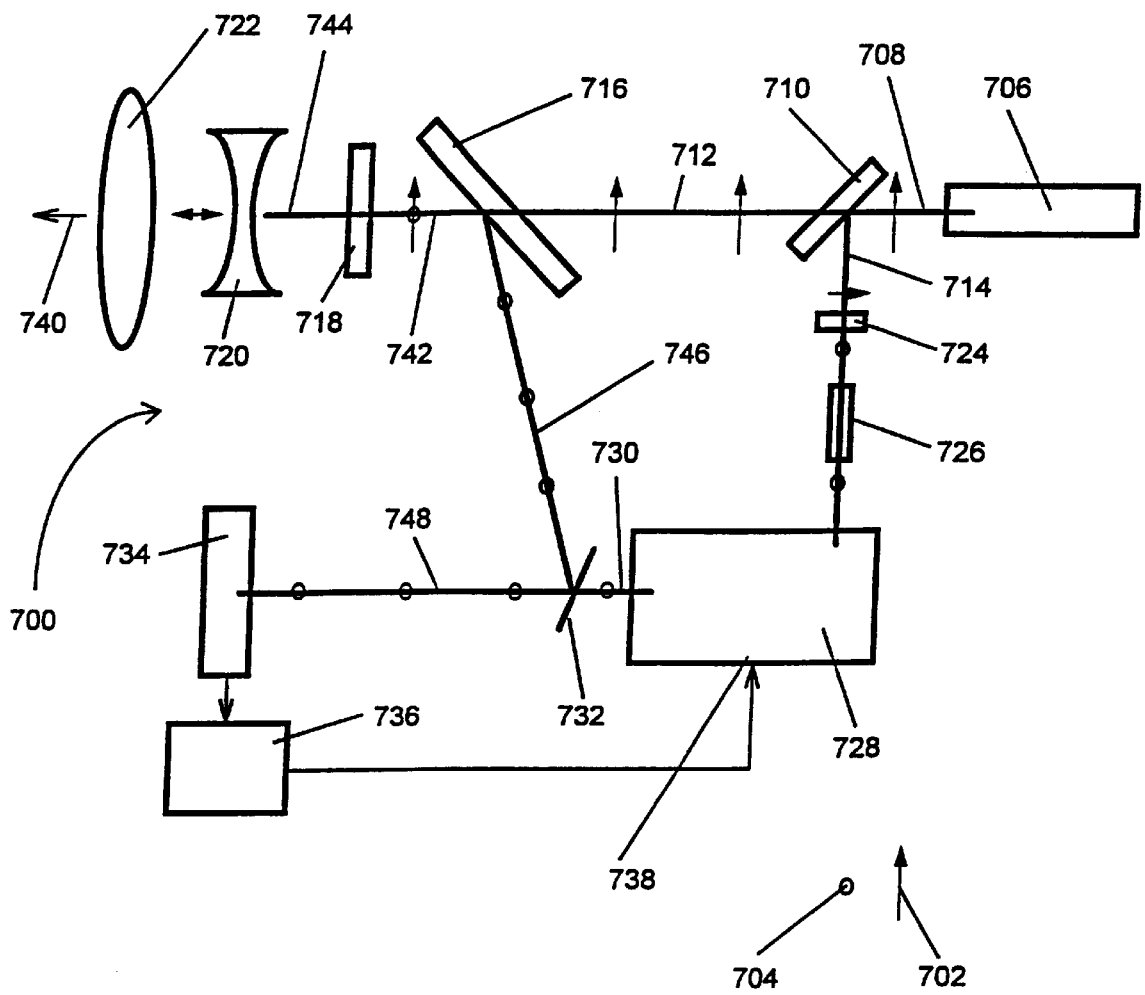
FIG. 13 is a schematic drawing of an analyzer of the invention incorporated into a laser radar system.

Referring now to FIG. 13, there is shown a laser radar system indicated generally by 700 incorporating a radiation field analyzer of the invention. Polarization directions of radiation beams within the system 700 are indicated by arrows 702 and circles 704, which correspond respectively to linear polarization in the plane of the drawing and perpendicular to it. The system 700 incorporates a $CO_2$ laser source 706 with an output radiation beam 708 of approximately 5 watts power, having a 10.6 $\mu$m free-space wavelength and having a beam diameter of 2 mm. A beam splitter 710, fabricated from a plate of zinc selenide onto which a multidielectric coating has been vacuum-evaporated, lies in the path of the beam 708 and defines transmitted and reflected beams 712 and 714 with respective intensities in the ratio of 9 to 1. in the path of the transmitted beam 712 lies a zinc selenide plate 716 inclined to the path at the Brewster angle, a quarter-wave plate 718, and a telescope arrangement of concave and convex lenses 720 and 722.

In the path of the reflected beam 714 lie a half-wave plate 724, an acousto-optic modulator 726 and a tunable mode converter 728 which is similar to the mode converter 28 described earlier. The modulator 726 provides phase modulation of incident light at a phase modulation frequency of 60 MHz with modulation limits of $+\pi$ and $-\pi$ radians. The mode converter 728 has a mode controllable output beam 730 directed to a combiner plate 732 and a liquid-nitrogen cooled cadmium mercury telluride detector 734 having a bandwidth of 500 MHz. The detector 734 is connected to a signal processing unit 736 incorporating a computer (not shown) which is connected in turn to a mode control input 738 of the mode converter 728.

The radar system 700 operates as follows. The laser beam 708 is linearly polarized in the plane of the drawing, and is partly transmitted and partly reflected by the beam splitter 710. The transmitted beam 712 is incident on the zinc selenide plate 716 through which it is transmitted efficiently by virtue of its polarization direction to form an outward beam in a region 742 located between the plate 716 and the quarter-wave plate 718. The outward beam in the region 742 is subsequently transmitted through the quarter-wave plate 718 which changes the linearly-polarized outward beam into a circularly-polarized outward beam in a region 744 located between the quarter-wave plate 718 and the concave lens 720. The circularly-polarized outward beam in the region 744 is then magnified by the concave and convex lenses 720 and 722 to form a collimated coherent magnified beam 740. The beam 740 illuminates a remote scene (not shown) at a distance which may be of the order of 5 km. When the beam 740 is incident at a remote scene 5 km distant, its diameter is approximately 1 meter as a result of beam divergence. Incident coherent radiation is reflected or scattered from the remote scene and part of the reflected or scattered radiation re-enters the radar system 700 through the lenses 720 and 722 to form a return beam in the region 744; the intensity of the coherent radiation which re-enters the radar system 700 is approximately a few femtowatts. The return beam in the region 744 is then transmitted through the quarter-wave plate 718 which changes the circularly-polarized return beam in the region 744 to a linearly-polarized return beam in the region 742. The linearly-polarized return beam in the region 742 is subsequently incident on the zinc selenide plate 716 which reflects efficiently components of the return beam in the region 742 to form a reflected beam 746 which is orthogonally polarized relative to the outward beam in the region 742. The reflected beam 746 is incident on the combiner plate 732 from whence it is reflected into the detector 734 along a path 748.

The reflected beam 714 is transmitted through the half-wave plate 724, providing a polarization rotation of $\pi/2$ radians, after which it is transmitted through the acousto-optic modulator 726 into the mode converter 728. The mode converter 728 converts input radiation contained in the beam 714 into a series of different modes which are individually selected by a control signal applied to the mode control input 738. These modes are output to form the beam 730. The beam 730 is transmitted through the combiner plate 732 to be incident on the detector 734 where it creates interference with the beam 746 reflected from the combiner plate 732; radiation incident on the detector 734 creates an output signal which is conveyed to the signal processing unit 736. The effect of the acousto-optic modulator 726 applying a 60 MHz phase modulation to the reflected beam 714 is to create 60 MHz periodic-variations in the output signal at the detector 734; the difference between maximum and minimum intensities in the output signal at the detector 734 provides an indication of the magnitude of laser radiation reflected from the remote scene for a particular selected radiation mode generated by the tunable mode converter 728 and for a given output power of the laser 706. The output signal generated at the detector 734 is conveyed to the processing unit 736 which analyzes the signal to provide output data corresponding to the difference between maximum and minimum radiation intensities for each of the modes which are selected by means of a control signal supplied to the mode control input 738 of the mode converter 728.

An advantage of this form of signal analysis as described above is that the average level of radiation incident upon the detector 734 is disregarded, although any random fluctuations in that average level, arising for example from any random fluctuations in the radiation power contained in the beam 708 emitted from the laser 706, will have the effect of degrading the signal-to-noise ratio of the output data described above. Thus, it is beneficial to try to minimize the coupling of radiation to the beam 746 which does not arise from reflection of coherent radiation from the remote scene; however, it is desirable to ensure that the power of the beam 730 emitted from the mode converter 728 is at least greater than the maximum power expected in the received radiation which is reflected from the remote scene and which re-enters the laser radar system 700 in order to ensure that the difference between maxima and minima in the signal from the detector 734 is proportional to the amount of reflected radiation from the remote scene and not limited by the available power in the beam 730 emitted from the tunable mode converter 728. The power in the beam 730 may be in the order of 1 milliwatt to ensure that noise in the signal from the detector 734 arises predominantly from random power fluctuations in the beam 730 rather than from noise arising in the detector 734 itself. Satisfactory partitioning of the radiation in the beam 708 is achieved by selecting a suitable 9:1 splitting ratio for the beam splitter 710, and by incorporating the plate 716 and the quarter-wave plate 718 into the laser radar system 700 to isolate components of radiation exiting to and returning from the remote scene.

The tunable mode converter 728 permits a particular spatial mode present in the radiation reflected from the remote scene to be selectively measured; interference signals are not produced at the detector 734 if the radiation modes existing in the beams 746 and 730 are dissimilar. Thus, the laser radar system 700 permits the mode type and energy contained within each mode present in the reflected radiation from the scene to be measured.

The two lenses 720 and 722 increase the diameter of the beam 712 approximately 20-fold such that the beam 740 is of approximately 5 cm diameter in order to reduce diffraction effects which would otherwise occur if a narrow beam of a few millimeters diameter were emitted towards the remote scene.

The laser radar system 700 as described above enables identification of features present in a remote scene at which the beam 740 is directed on account of the power and the modes contained in the reflected or scattered radiation which re-enters the radar system 700 from the remote scene characterizing the features in the remote scene.

In a modified embodiment of the laser radar system 700, the tunable mode converter 728 outputs a number of modes simultaneously at the output beam 730, rather than individual pure modes as described above; in this further embodiment, the modal composition of the beam 730 is varied by means of a control signal supplied to the mode control input 738 of the mode converter 728. The contribution made by each mode present simultaneously in the beam 730 to the interference signal measured at the detector 734 is then determined by making a series of measurements where the relative intensities of the modes present in the beam 730 are varied for each of the measurements. By means of a matrix calculation together with prior knowledge of the modal composition of the beam 730 for a given control signal supplied to the mode control input 738, the intensity of the individual modes present in the reflected radiation from the remote scene may be determined.

In yet another modified embodiment of the laser radar system 700, a beam scanning unit comprising actuated tiltable mirrors may be added between the lens 722 and the remote scene in order to enable the beam 740 to be scanned over an area of the remote scene which is larger than the diameter of the beam 740 at the remote scene. Moreover, a variable attenuator may be inserted between the mode converter 728 and the combiner plate 732 in order to enable the laser radar system 700 to cope with a large range of power, from femtowatts to milliwatts, contained in the reflected or scatter radiation which re-enters the laser radar system 700 through the lenses 720 and 722.

A conventional approach often employed when constructing a practical optical system involves mounting each of its components on mechanical mounts providing component tilt and translation adjustment, and arranging for free space propagation of radiation between the components. The system 700 is constructed using this approach where its components comprising the laser source 706, the beam splitter 710, the plates 716, 718, 724, 732, the modulator 726, the converter 728, the lenses 720, 722 and the detector 734 are held in mechanical mounts.

High-order Hermite-Gaussian radiation modes are able to propagate around the system 700 on account of its free-space construction. The high order modes may arise from reflection of radiation from the remote scene, may be generated by the converter 728 or may arise within the system 700 if its components are misaligned relative to one another. The misalignments adversely affect its performance. Adjustment of the mounts to correct for the misalignments is a painstaking procedure to undertake in practice. The misalignments are required to be less than ±0.2 mrad from optimum settings to achieve satisfactory system performance. Moreover, incorporation of the mechanical mounts makes the system 700 bulky, unstable and costly to manufacture. This approach for its construction thus has a number of practical problems associated with it.

Accurate angular alignment of the components is necessary in the system 700 to avoid coupling of radiation from one propagating mode to another at the components. For example, when a first beam of fundamental mode radiation of wavelength $\lambda$ and a diameter $\alpha$ is incident in a first direction onto an optical surface of a mirror or beam splitter and reflected therefrom as a second beam of fundamental mode radiation in a second direction orthogonal to the first direction, the surface must be accurately orientated at an angle $\theta$ of 45° relative to the first direction. If the angle $\theta$ deviates from 45°, the fundamental mode radiation in the first beam will be converted into high order mode radiation of order m in the second beam. For each of the high order modes, their amplitude in the second beam will be greatest when the angle $\theta$ deviates by an angular error $\delta\theta$ given by equation [1] where $$\delta\theta = \frac{m\lambda}{2\alpha} \qquad \text{Eq. 1}$$

For example, when the first beam has a diameter of 5 mm as occurs in the system 700 and comprises fundamental mode radiation of 10.6 μm wavelength, the second beam comprises a greatest proportion of mode radiation of order m=2 when the error δθ is approximately 2 mrad. It is desirable in the system 700 to ensure that misalignments are at least an order of magnitude less than this error δθ in order to ensure mode purity. Thus, the mechanical mounts holding the components in the system 700 are adjusted so that angular misalignments are at least less than ±0.2 mrad.

In a modified embodiment of the system 700, a solution to these practical problems may be provided by constructing it so that several of the components are incorporated into one or more hollow waveguide integrated optic structures. The structures may be fabricated from solid pieces of polycrystalline alumina material, for example a material type Kyocera A479 obtainable from a company Kyocera of Japan. Alumina is particularly suitable for use with 10.6 μm wavelength radiation because low loss hollow waveguides for guiding the radiation efficiently may be cut into it by using a computer numerical control (CNC) machining process. Moreover, component alignment slots may also be machined into it. The slots may be arranged to accommodate many of the components, for example the beam splitter 710 and the plates 716, 718, 724, 732. The machining process is executable in two stages. In a first stage of fabrication, a bulk of excess alumina is removed by employing a coarse milling process. In a second stage of fabrication, a jig grinder is employed to provide a final finish to the pieces. The slots produced using this process may exhibit small angular alignment errors of ±0.2 mrad or less. As the plates 716, 718, 724, 732 and the beam splitter 710 are components of 4 mm thickness and with optical faces of 20 mm by 20 mm size, the slots are machined to a tolerance error in a range of +2.5 μm to +5 μm in order to achieve these small alignment errors, for example an error of 5 μm along one of the slots will result in a angular misalignment of a component located therein of 0.25 mrad. It is found that 2.0 mm wide hollow waveguides fabricated by the process are capable of guiding fundamental $EH_{11}$ mode 10.6 μm wavelength radiation through distances of several meters with an efficiency in excess of 90%.

Figure 14:
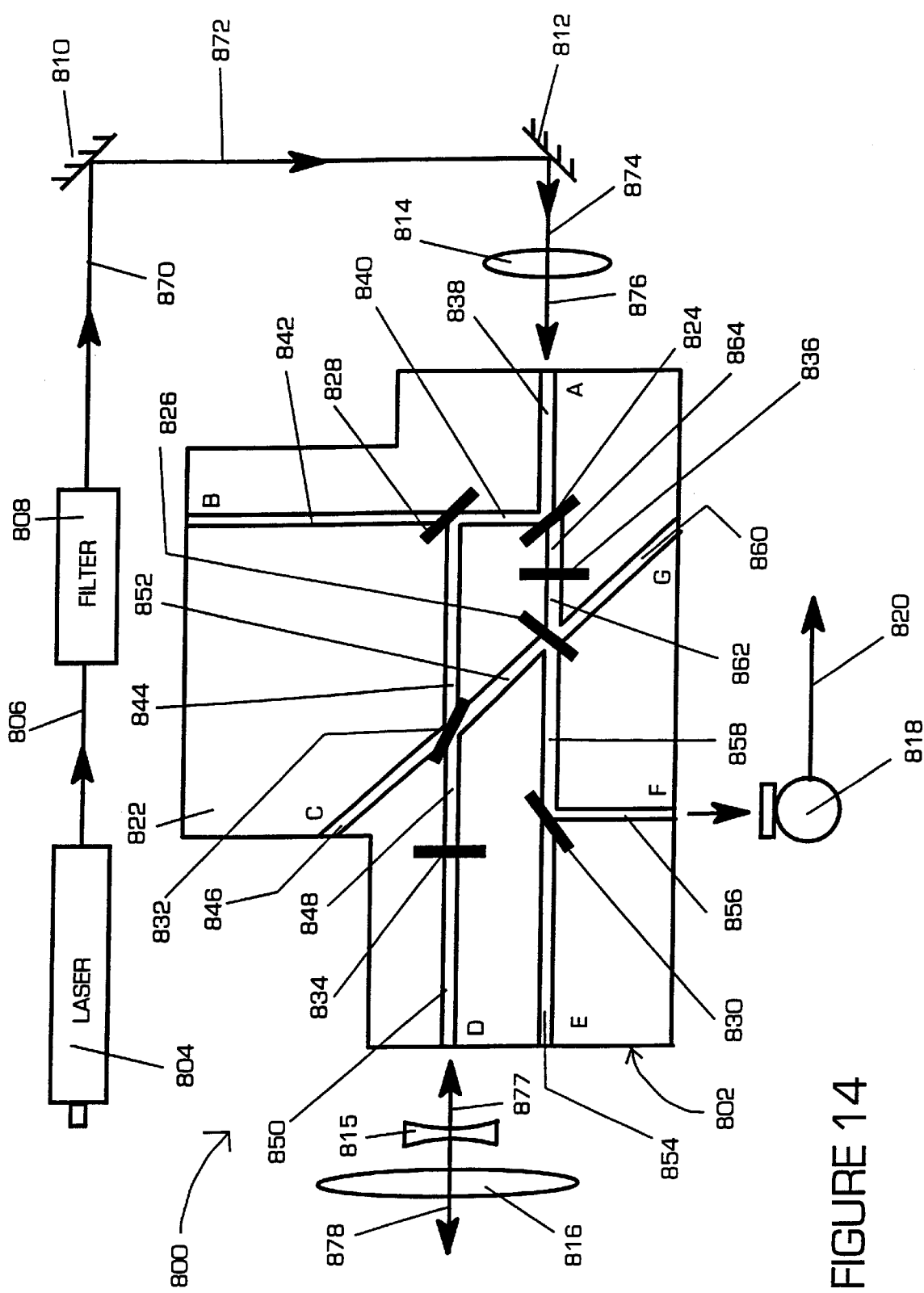
FIG. 14 is a schematic drawing of an analyzer of the invention incorporating a hollow waveguide integrated optic structure.

Referring now to FIG. 14, there is shown an analyzer of the invention indicated generally by 800 incorporating a hollow waveguide integrated optic structure 802, a laser source 804 arranged to emit a beam 806 of linearly polarized electromagnetic radiation of 10.6 μm wavelength, a spatial filter 808, two mirrors 810, 812, a bi-convex lens 814, a bi-concave transceiving lens 815, a bi-convex transceiving lens 816 and a cooled cadmium mercury telluride detector 818 arranged to convert radiation incident upon it into an electrical signal at an output 820 which is connected to external signal processing equipment (not shown). The detector 818 is arranged to provide a transducing bandwidth of 60 MHz. The source 804 is a proprietary coherent continuous wave $CO_2$ laser arranged to provide the beam 806 of continuous output power in a range of 5 to 20 Watts. The filter 808 is a proprietary unit arranged to provide selective transmission of $TEM_{00}$ mode radiation to provide a high purity $TEM_{00}$ mode output beam from it.

The structure 802 comprises an alumina block 822 incorporating two beam splitting plates 824, 826, two fully reflecting mirrors 828, 830, a Brewster plate 832, a quarter wave plate 834 and a half wave plate 836. Alumina material for the block 822 is obtainable from Kyocera Ltd. of Japan. The plates 824, 826, 832, 834, 836 and the mirrors 828, 830 are accurately located into slots machined into the block 822 to an angular error tolerance of not more than ±0.2 mrad. The slots are made to match dimensions of the components to be fitted into them to within a error tolerance in a range of +2.5 μm to +5 μm. Moreover, the block 822 incorporates hollow waveguides 838 to 864 which are CNC machined into it and which are of 2 mm by 2 mm square cross-section. The waveguides 838 to 864 are machined into the block 822 with similar angular and dimensional tolerances to those of the slots. The structure 802 incorporates six ports A, B, C, D, E, F, G where the waveguides 838, 842, 846, 850, 854, 856, 860 respectively reach a periphery of the structure 802. The port A is arranged to receive radiation, the port F is arranged to emit radiation and the port D is arranged to both receive and emit radiation.

The waveguides 838 to 864 have mutually coplanar axes. The waveguides 854, 858 are substantially coaxial to one another and axially orientated along a first waveguide axis. The waveguides 862, 864 are coaxial to one another and axially orientated parallel to the first waveguide axis. They are orthogonally laterally offset by approximately half their width therefrom to account for refractive lateral displacement of radiation transmitted through the plate 826. The waveguide 838 is axially parallel to the first waveguide axis and orthogonally laterally offset by approximately half its width therefrom to account for refractive lateral displacement of radiation transmitted through the plates 824, 826. The waveguides 846, 852, 860 are coaxial to one another and are axially orientated along a second waveguide axis which subtends an angle of 45° relative to the first waveguide axis. The waveguides 848, 850 are coaxial to one another and are axially orientated along a third waveguide axis which is parallel to the first waveguide axis. The waveguide 844 is axially parallel to the third waveguide axis and orthogonally laterally offset by approximately half its width therefrom to account for refractive lateral displacement of radiation transmitted through the plate 832. The waveguides 840, 842, 856 are axially orientated parallel to a fourth waveguide axis which is orthogonal to the first waveguide axis.

The waveguide 838 is located between the port A and a first face of the plate 824. The waveguide 864 is located between a second face of the plate 824 and a first face of the plate 836. The waveguide 840 is located between the first face of the plate 824 where it is arranged to intersect the waveguide 838 and a first face of the mirror 828. The waveguide 860 is located between the port G and a first face of the plate 826. The waveguide 862 is located between a second face of the plate 836 and the first face of the plate 826 and is arranged to intersect the waveguide 860 there. The waveguide 842 is located between the port B and a second face of the mirror 828. The waveguide 846 is located between the port C and a first face of the plate 832. The waveguide 844 is located between the first face of the mirror 828 and the first face of the plate 832 where it is arranged to intersect the waveguide 846. The waveguide 854 is located between the port E and a first face of the mirror 830. The waveguide 856 is located between the port F and a second face of the mirror 830. The waveguide 858 is located between the second face of the mirror 830, at which it intersects the waveguide 856, and a second face of the plate 826, whereat it is arranged to intersect the waveguide 852. The waveguide 850 is located between the port D and a first face of the plate 834. The waveguide 852 is located between the second face of the plate 826 and a second face of the plate 832 whereat it is arranged to intersect the waveguide 848. The waveguide 848 is located between a second face of the plate 834 and the second face of the plate 832.

The plates 834, 836 are orientated so that normals to their faces are parallel to the first waveguide axis. The plate 824 is orientated so that a normal to its first and second faces, which are parallel to one another, is orientated at 45° to the first and fourth waveguide axes. The mirror 828 is orientated so that a normal to its first face is orientated at an angle of 45° to the third and fourth waveguide axes. The mirror 830 is orientated so that a normal to its second face is orientated at angle of 45° relative to the first and fourth waveguide axes. The plate 826 is orientated so that a normal to its faces, which are parallel to one another, is at an angle of 22.5° relative to the first and second waveguide axes. Likewise, the plate 832 is orientated so that a normal its faces, which are parallel to one another, are at an angle $\theta_b$ of 67.5° to the second and third waveguide axes. The angle $\theta_b$ is selected so that plate 832 is orientated approximately at its Brewster angle given by equation [2], namely $$\theta_b = \tan^{-1}(n) \qquad \text{Eq. 2}$$

where n is a refractive index for the plate 832. The plate 832 comprises zinc selenide which has a refractive index 2.403 for which $\theta_b=67.4°$ from equation [2].

The plates 824, 826 are arranged to reflect 99% of radiation incident upon their first faces and transmit 1% of the radiation from their second faces. The mirror 828 is arranged to fully reflect radiation incident on its first face. The mirror 830 is arranged to fully reflect radiation incident on its second face. The plate 834 is arranged so that linearly polarized radiation incident upon it is transmitted through it to emerge as circularly polarized radiation and circularly polarized radiation incident upon it is transmitted through it to emerge as linearly polarized radiation. The plate 836 is arranged so that radiation linearly polarized in a first polarization direction incident upon it is efficiently transmitted through it to emerge as radiation linearly polarized in a polarization direction orthogonal to the first polarization direction. The plate 832 is arranged to transmit radiation linearly polarized in a first reference direction incident on its first face to its second face from where it is emitted, and to reflect efficiently radiation linearly polarized in a second reference direction orthogonal to the first reference direction incident upon its second face.

The port D is arranged to emit radiation towards and receive radiation from the remote scene via the lenses 815, 816. The port F is arranged to direct radiation onto the detector 818. The port A is arranged to receive radiation emitted from the source 804 which is transmitted through the filter 808, reflected in sequence from the mirror 810 to the mirror 812 and then focused through the lens 814 onto the port A. The lenses 814, 815, 816 are arranged to provide efficient coupling of radiation to and from the structure 802.

Operation of the analyzer 800 will now be described with reference to FIG. 14. It is designed to analyze $EH_{11}$ fundamental mode waveguide radiation. The source 804 emits the beam 806 which propagates to the spatial filter 808 whereat it is filtered so that a beam 870 emitted therefrom contains predominantly linearly polarized $TEM_{00}$ mode radiation. The beam 870 is incident in a first beam direction on the mirror 810 which reflects it to form a linearly polarized beam 872 propagating in a second beam direction orthogonal to the first beam direction. The beam 872 is then incident on the mirror 812 which reflects it to form a linearly polarized beam 874 propagating in a third beam direction orthogonal to the second beam direction and parallel and opposite to the first beam direction. The beam 874 is incident on the lens 814 which focuses it to produce a linearly polarized beam 876 which propagates into the port A of the structure 802. The beam 876 comprises essentially pure $TEM_{00}$ mode radiation and has a waist diameter at the port A of 0.71a where a is a side length of the waveguide, namely 2 mm. This ensures efficient coupling in excess of 98% of radiation in the beam 874 through the port A into the waveguide 838 wherein it propagates as linearly polarized $EH_{11}$ fundamental mode radiation.

The beam 876 propagates along the waveguide 838 to the first face of the plate 824 from where 99% of it is reflected as a linearly polarized reflected beam propagating in the waveguide 840, and 1% of it is transmitted as a linearly polarized transmitted beam propagating in the waveguide 864. The reflected beam in the waveguide 840 is incident on the first face of the mirror 828 from which it is fully reflected and the propagates as a linearly polarized reflected outgoing beam along the waveguide 844. The outgoing beam is incident on the first face of the plate 832 through which it is transmitted to the second face thereof from where it propagates as a linearly polarized transmitted outgoing beam along the waveguide 848. The outgoing beam in the waveguide 848 is incident on the second face of the plate 834 through which it is transmitted to the first face thereof from where it emerges as a circularly polarized outgoing beam propagating along the waveguide 850 to the port D. The outgoing beam in the waveguide 850 is emitted from the port D as a narrow beam 877 of 2 mm diameter which propagates as free space circularly polarized radiation towards the lenses 815, 816 which form a Gallilean telescope. The beam 877 is incident on the lenses 815, 816 which transmit it and enlarge its diameter to form a broad circularly polarized beam 878 of approximately 50 mm diameter for illuminating a remote scene (not shown). The lenses 815, 816 increase size of the beam 877 to reduce diffractive dispersion effects which are encountered with narrow free space propagating beams so that the beam 878 only diverges to a diameter of 1 meter at a distance of 5 km from the analyzer 800.

The transmitted beam propagating along the waveguide 864 is incident on the first face of the plate 836 through which it is transmitted to the second face thereof from where it emerges into the waveguide 862 as a transmitted reference beam whose linear polarization direction is orthogonal to that of the beam in the waveguide 864. The reference beam is incident on the first face of the plate 826 through which 1% of it is transmitted to the second face thereof as a local oscillator reference beam into the waveguide 858 and 99% of it is reflected into the waveguide 860 along which it propagates to the port G from where it is emitted into free space. The reference beam propagates along the waveguide 858 to the second face of the mirror 830 from where it is fully reflected and propagates as a linear polarized reference beam along the waveguide 856 to the port F. The reference beam is emitted from the port F onto the detector 818 as local oscillator radiation.

The beam 878 is incident on the remote scene which partially reflects and scatters it. Reflected circularly polarized radiation from the scene propagates back through the lenses 815, 816 and couples into the port D as a circularly polarized return beam which propagates along the waveguide 850. The return beam is incident on the first face of the plate 834 through which it is transmitted to the second face thereof from where it propagates as a linearly polarized return beam along the waveguide 848 to the second face of the plate 832. The return beam incident on the second face of the plate 832 is reflected thereat because its polarization direction is orthogonal to the outgoing beam in the waveguide 844 and propagates as a return beam along the waveguide 852 to the second face of the plate 826. The plate 826 reflects 99% of the return beam incident on its second face to provide a reflected return beam which propagates along the waveguide 858 and is incident on the second face of the mirror 830. It is reflected at the second face and propagates as a return beam, along the waveguide 856 to the port F from where it is emitted onto the detector 818 as remote scene reflected radiation.

The local oscillator and target reflected radiation mutually interfere on the detector 818 to provide a signal at the output 820 exhibiting cyclical variations according to distance of the remote scene from the analyzer 800. Moreover, the cyclical variations have an amplitude which is dependent upon the nature of the remote scene and changes in its distance from the analyzer 800. The signal is passed to the external signal processing equipment (not shown).

It is found particularly advantageous in practice to mount the mirrors 828, 830 and the plates 824, 826, 832 834, 836 together in the hollow waveguide integrated structure 802 because painstaking adjustment and calibration of the analyzer 800 are thereby avoided. The waveguides 838 to 864 ensure efficient propagation of radiation within the structure 802. Moreover, accurate mutual angular alignment of the waveguides 838 to 864, the mirrors 828, 830 and the plates 824, 826, 832, 834, 836 to one another are achievable by mounting the plates and the mirrors within accurately machined slots in the structure 802.

In the structure 802, the waveguides 838 to 864 are capable of guiding high order $EH_{mn}$ mode radiation because their width is several hundred multiples of wavelengths of the radiation propagating within them. It is desirable that only fundamental mode $EH_{11}$ radiation propagates within the analyzer 800 because the high order $EH_{mn}$ radiation modes (i) have higher attenuation coefficients than fundamental mode $EH_{11}$ radiation;
(ii) couple less efficiently from the ports of the structure 802 to $TEM_{00}$ free space modes than fundamental mode $EH_{11}$ radiation; and
(iii) do not interfere on the detector 818 with fundamental mode $EH_{11}$ radiation to provide an interference signal there.

The signal variation achievable at the output 820 for a given output from the laser 804 illuminating the remote scene is described by a parameter known as homodyne/heterodyne detection efficiency. Accurate alignment of the waveguides 838 to 864, the mirrors 828, 830 and the plates 824, 826, 832, 834, 836 to one another in the structure 802 ensures that fundamental mode $EH_{11}$ radiation is not dispersed within the analyzer 800 into high order $EH_{mn}$ mode radiation. This ensures that it provides an experimentally measured detection efficiency approaching 81.4% of theoretical maximum efficiency for it. This is a high efficiency compared to prior art analyzers.

Waveguide constrainment of beam width within the structure 802 provides an unexpected advantage that angular misalignment tolerances for the mirrors 828, 830 and the plates 824, 826, 832, 834, 836 may be relaxed for achieving comparable homodyne/heterodyne detection efficiency compared to a free space implementation of the analyzer 800 in which waveguides 838 to 864 are not present. Angular misalignment tolerance $\delta\theta$ for the mirrors 828, 830 and plates 824, 826, 832, 834, 836 is required to be less than $\pm\lambda/10a$ where a is waveguide width and $\lambda$ is radiation wavelength in order to ensure that fundamental mode $EH_{11}$ radiation is not coupled to high order $EH_{21}$ mode radiation within the structure 802. The tolerance $\delta\theta$ is inversely proportional to a hence $\delta\theta$ may be relaxed to $\pm 1$ mrad when a=1 mm or be more made more stringent at $\pm 0.5$ mrad when a=2 mm. However, lateral alignment of the waveguides 838 to 864 to one another becomes more problematic when a is decreased. An acceptable required lateral alignment tolerance $\delta l$ is given by equation [3] where $$\delta l = \pm \frac{a}{20} \qquad \text{Eq. 3}$$

Equation 3 is based upon a characteristic that fundamental $EH_{11}$ mode radiation is only weakly coupled between two axially-parallel end-abutted waveguides when laterally displaced by half their width relative to one another, and that the tolerance $\delta l$ should at least be an order of magnitude less to ensure efficient coupling between the waveguides. In practice, lateral alignment tolerances are easier to achieve than angular alignment tolerances when waveguides are approximately 1 mm by 1 mm in size.

The slots in the block 822 for accommodating the mirrors 828, 830 and the plates 824, 826, 832, 834, 836 are sufficiently accurately machined to ensure that the angular misalignments of the mirrors and plates are less than $\pm 0.2$ mrad, thereby providing the high detection efficiency for the analyzer 800. In a comparable free space implementation of the analyzer 800, angular misalignments of less than $\pm 0.1$ mrad are be required for achieving a comparable detection efficiency.

In the analyzer 800, the plates 824, 826 ensure that only 0.01% of power in the beam 876, namely approximately 1 mW, reaches the detector 818 directly through the waveguides 838, 856, 858, 862, 864. This provides an advantage that most of the beam 876 is transmitted via the block 822 to the remote scene and that the detector 818 is not saturated by excess radiation incident upon it. The plates 824, 826 may be replaced by other plates providing different ratios of radiation transmission and reflection at their surfaces so that a fraction in a range of 10% to 0.001% of power in the beam 876 reaches the detector 818.

Figure 15:
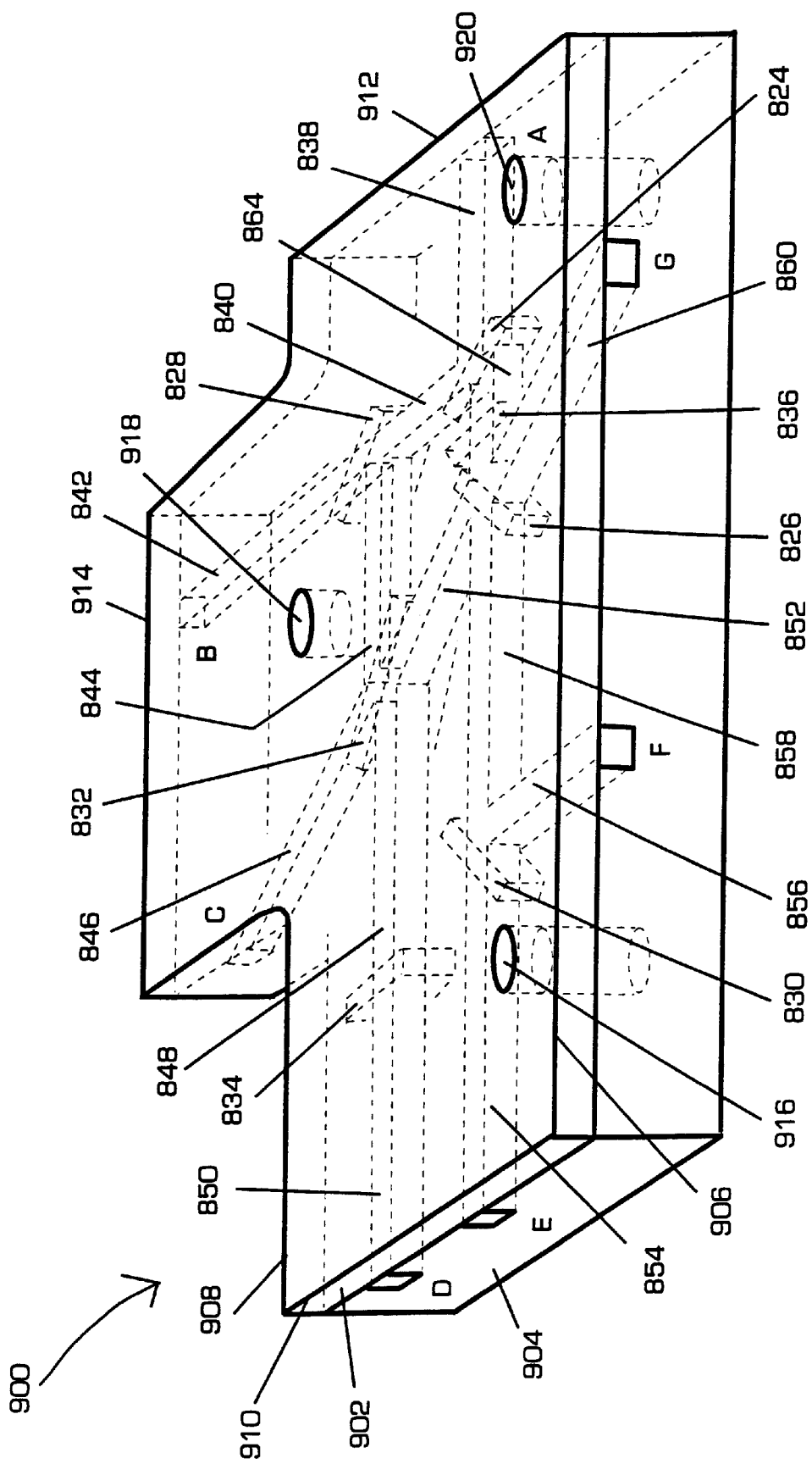
FIG. 15 is a perspective view of the integrated optic structure in FIG. 14.

Referring now to FIG. 15, there is shown a perspective view of the integrated optic structure 802 indicated generally by 900. The structure 900 comprises an alumina cover plate 902 and an alumina base plate 904. The plates 902, 904 are machined so that their perimeter profiles are identical. The plates 902, 904 are 5 mm and 20 mm thick respectively. The plate 902 incorporates perimeter edges 906, 908, 910, 912, 914 where the edges 906, 908 are parallel to one another and spaced 110 mm apart, the edges 910, 912 are parallel to one another and spaced 200 mm apart and the edges 906, 914 are parallel to one another and spaced 185 mm apart.

The waveguides 838 to 864 are incorporated into the base plate 904 by machining channels into it which are 2 mm deep and 2 mm wide. The channels are machined to a dimension error tolerance of less than $\pm 0.1$ mm and to an angular alignment error tolerance of less than $\pm 0.5$ mrad relative to one another. Slots are machined into both the cover plate 902 and the base plate 904 by milling and jig grinding processes to accommodate the mirrors 828, 830 and the plates 824, 826, 832, 834, 836. The slots are machined to match dimensions of these mirrors and plates to a machining error tolerance in a range +2.5 $\mu$m to +5.0 $\mu$m, and an angular alignment error tolerance of less than $\pm 0.5$ mrad relative to one another and to the channels. The ports A to G are formed where the channels reach side faces of the base plate 904.

The plates 902, 904 both incorporate a set of three holes 916, 918, 920 for alignment and mounting purposes. The sets of holes align when the two plates are correctly located to one another so that their perimeter edges align. Precise alignment of plates 902, 904 is ensured by the slots in the plates 902, 904 locating to the mirrors 828, 830 and the plates 824, 826, 832, 834, 836. The structure 900 is mountable on a support (not shown) by inserting screws into the holes 916, 918, 920 to secure it to the support.

In a modified embodiment of the analyzer 800, other waveguide cross-section sizes may be employed in the structure 802. Misalignment tolerances in the structure 802 for a given detection efficiency may be relaxed inversely to waveguide cross-section size whilst still achieving a detection efficiency of over 75%. Waveguides of smaller size than 2 mm by 2 mm result in higher attenuation coefficients and demand more accurate lateral alignment of the waveguides 838 to 864 to one another. In practice, rectangular or square waveguides with edge width in a range of 0.5 mm to 5 mm are satisfactory. The block 822 may comprise other dielectric materials when the analyzer 800 is employed for radiation of wavelength other than 10.6 $\mu$m, for example ceramic/plastic composites and metallic compounds such as beryllia (BeO) may be used.

In another modified embodiment of the analyzer 800, a second detector may be located at the port G to provide a second detector output. This second output and the output 820 may be amplified and then subtracted from one another to provide a difference signal in which noise arising from fluctuations in the beam 806 is reduced relative to an interference signal therein arising from radiation reflected from the remote scene compared to the signal at the output 820. This provides an advantage that noise arising from the laser 804 may be partially removed thereby improving analyzer signal-to-noise performance.

In yet another modified embodiment of the analyzer 800, an opto-acoustic or electro-optic modulator may be incorporated into the block 822, for example in the waveguide 844, to enable the analyzer 800 to perform remote scene distance measurement. Computing equipment, for example a microprocessor, may be incorporated into the analyzer to generate a phase modulation signal which may be applied to the modulator to phase modulate the beam 878. Phase comparison of the modulation signal to the signal at the output 820 in the computing equipment enables the analyzer 800 to be used for remote scene distance measurement.

The analyzer 800 may be incorporated into a laser radar system (lidar), for example in a system for remote scene characterization. Alternatively, it may be incorporated into an optical system, for example a metrology system for measuring distances. Accordingly, the term analyzer or analyzer system includes laser radar systems and optical systems as well.

The underlying concepts herein described could also be used as the basis of a communications system wherein individual modes are modulated in phase, frequency, or amplitude before being multiplexed and transmitted through a multimode propagation medium. The information carried on each mode could then be extracted by means of coherent mixing with the appropriate output of a mode generator.

We claim:

1. A radiation field analyzer (10) for analyzing at least partially coherent radiation received from a scene wherein the analyzer includes:
    a radiation combiner (12) for combining said received radiation from the scene with each of a plurality of orthogonal spatial radiation mode fields to provide interference signals, and
    detecting means (34) for detecting the interference signals and for providing an analysis of the radiation from the scene in the form of a spatial mode spectrum.

2. A radiation field analyzer according to claim 1 wherein the radiation combiner comprises a multimode waveguide structure (12).

3. A radiation field analyzer according to claim 1 wherein the analyzer includes a radiation converter (28) for generating the spatial radiation mode fields by converting radiation of at least one mode into radiation of differing modes.

4. A radiation field analyzer according to claim 3 wherein the radiation converter provides means for generating a set of spatial radiation mode fields from a fundamental mode input.

5. A radiation field analyzer according to claim 3 wherein the radiation converter incorporates at least one mirror (350) arranged for rotation about two axes to generate a set of radiation mode fields.

6. A radiation field analyzer according to claim 5 wherein the analyzer incorporates at least two such mirrors (350, 352).

7. A radiation field analyzer according to claim 6 wherein the radiation converter comprises means for selectively generating symmetric or antisymmetric mode fields.

8. A radiation field analyzer according to claim 6 wherein the radiation converter is arranged to generate a signal of substantially one radiation mode field at any one particular time.

9. A radiation field analyzer according to claim 3 wherein the radiation converter comprises means for launching two appropriately tilted and phase offset light beams into a single multimode waveguide.

10. A radiation field analyzer according to claim 1 wherein the analyzer includes a main laser source (24) arranged to illuminate the scene through the radiation combiner.

11. A radiation field analyzer according to claim 1 wherein the radiation combiner is arranged to generate the interference signals by phase modulating the spatial radiation mode fields with respect to the radiation received from the scene.

12. A radiation field analyzer according to claim 1 wherein the radiation combiner incorporates a dielectric beam splitter (38).

13. A radiation field analyzer according to claim 1 wherein the radiation combiner comprises a multimode waveguide interference coupler.

14. A radiation field analyzer (732, 728) according to claim 3 wherein the analyzer is incorporated within a laser radar system (700), the radar system further comprising a source (706) of laser radiation for illuminating a scene and for providing the radiation converter (728) with a reference signal (714), means (722, 720, 718, 716) for receiving radiation reflected by the scene and for inputting said received radiation to said analyzer, and said detecting means including a processor (736) for performing a modal analysis on said received radiation.

15. A radiation field analyzer (800) for analyzing at least partially coherent radiation received from a remote scene, said analyzer comprising:
    integrated optical processing means (802) for combining said received radiation from the scene with at least one orthogonal spatial radiation mode field to provide interference signals, and
    detecting means (818) for detecting the interference signals and for providing an analysis of the radiation from the scene in the form of a spatial mode spectrum.

16. A field analyzer according to claim 15 wherein the processing means (802) comprises one or more optical components (824, 826, 828 to 836) for combining said radiation from the scene with said at least one orthogonal radiation mode field to provide said interference signals, and one or more waveguide structures (838 to 864) for guiding said radiation and radiation mode fields to and from the optical components (824, 826, 828 to 836).

17. A field analyzer according to claim 16 wherein the processing means (802) comprises one or more elements (822) of unitary construction which implement the waveguide structures (838 to 864) and which incorporate locating means for locating the optical components (824, 826, 828 to 836).

18. A field analyzer according to claim 17 wherein the locating means incorporates formations to locate the components (824, 826, 828 to 836) sufficiently accurately to inhibit inter-mode coupling of radiation.

19. A field analyzer according to claim 18 wherein said formations comprise one or more alignment slots in said elements (822) to locate the components (824, 826, 828 to 836).

20. A field analyzer according to claim 16 wherein the waveguide structures are one or more hollow waveguides (838 to 864).

21. A field analyzer according to claim 20 wherein said waveguides are rectangular cross-section waveguides with one or more side widths in a range of 0.5 mm to 5 mm.

22. A field analyzer according to claim 17 wherein the elements (902, 904) incorporate one or more alignment holes (916 to 920) for at least one of registering them to one another and mounting them on mounting means.

23. A field analyzer according to claim 17 wherein the elements (822, 902, 904) incorporate alumina material.

24. A field analyzer according to claim 17 wherein the elements (822, 902, 904) incorporate beryllia or plastic/ceramic composite materials.

25. A field analyzer according to claim 15 further incorporating radiation generating means for generating output radiation for irradiating the scene, source detecting means for detecting a fraction of said output radiation to provide one or more source signals, and subtracting means for subtracting said source signals from said interference signals and thereby providing one or more noise reduced output signals for use in analysis of the radiation from the scene.

26. A field analyzer according to claim 16 further including a laser for providing said at least partially coherent radiation and beam splitting means (824, 826) for splitting said laser radiation into one or more reference beams and one or more outgoing beams, beam separating means (832) for separating reflections of said laser radiation from the scene from said outgoing beams to provide one or more return beams, and combining means (826, 830) for combining said return beams with said reference beams to provide said interference signals.

27. A field analyzer according to claim 26 wherein the beam splitting means comprises one or more beam splitting plates (824, 826).

28. A field analyzer according to claim 26 wherein the beam separating means comprise at least one of one or more Brewster plates (832), one or more half wave plates (836) and one or more quarter wave plates (834).

29. A field analyzer according to claim 28 wherein said Brewster plates comprise zinc selenide material.

30. A field analyzer according to claim 26 further incorporating beam forming means (815, 816) for enlarging diameter of said outgoing beams.

31. A field analyzer according to claim 30 wherein said beam forming means comprise one or more lenses (815, 816).

32. A field analyzer according to claim 26 wherein the beam splitting means is (824, 826) is arranged to divert a fraction in a range of 0.001% to 10% of said input beams into said reference beams.

33. A field analyzer according to claim 15 wherein said detecting means (818) comprises one or more cadmium mercury telluride photodetectors.

34. A field analyzer according to claim 15 further incorporating phase modulating means for applying one or more modulating signals to phase modulate said received radiation from the analyzer and computing means for generating said modulating signals and for phase comparing said interference signals with said modulating signals to determine distance between the analyzer and the remote scene.

35. A radiation field analyzer system (800) for analyzing at least partially coherent radiation received from a scene, said analyzer comprising:

an integrated optical processor combining said received radiation from the scene with at least one orthogonal spatial radiation mode field to provide interference signals, and a detector detecting the interference signals and providing an analysis of the radiation from the scene in the form of a spatial mode spectrum.

36. A system according to claim 35 wherein the processor (802) comprises:

at least one optical component (824, 826, 828 to 836) combining said radiation from the scene with said at least one orthogonal radiation mode field to provide said interference signals; and at least one waveguide structure (838 to 864) guiding said radiation and radiation mode field to and from the optical components (824, 826, 828 to 836).

37. A system according to claim 36 wherein the processor (802) comprises at least one element (822) of unitary construction which implements the waveguide structures (838 to 864) and which incorporates a locator locating the optical components (824, 826, 828 to 836).

38. A system according to claim 37 wherein the locator incorporates formations to locate the components (824, 826, 828 to 836) sufficiently accurately to inhibit intermode coupling of radiation.

39. A system according to claim 38 wherein said formations comprise at least one alignment slot in said elements (822) to locate the components (824, 826, 828 to 836).

40. A system according to claim 36 wherein the waveguide structures comprise at least one hollow waveguide (838 to 864).

41. A system according to claim 40 wherein said waveguide structures are rectangular cross-section waveguides with at least one side width in a range of 0.5 mm to 5 mm.

42. A system according to claim 37 wherein said at least one element (902, 904) incorporates at least one alignment hole (916 to 920) for at least one of registering them to one another and mounting them on a mount.

43. A system according to claim 37 wherein said at least one element (822, 902, 904) incorporates alumina material.

44. A system according to claim 37 wherein said at least one element (822, 902, 904) incorporates beryllia or plastic/ceramic composite materials.

45. A system according to claim 35 wherein it incorporates:

a radiation generator generating output radiation for irradiating the scene, a source detector detecting a fraction of said output radiation to provide one or more source signals, and a subtractor for subtracting said source signals from said interference signals and thereby providing one or more noise reduced output signals for use in analysis of the radiation from the scene.

46. A system according to claim 36 wherein said at least one component comprises:

at least one beam splitter splitting at least one input radiation beam input to the analyzer into at least one reference beam and at last one outgoing beam for illuminating said scene, a beam separator separating radiation received from the scene from said at least one outgoing beam to provide at least one return beam, and a combiner (826, 830) combining said at least one return beam with said at least one reference beam to provide said interference signals.

47. A system according to claim 46 wherein said at least one beam splittor comprises at least one beam splitting plate (824, 826).

48. A system according to claim 46 wherein the beam separator comprises at least one Brewster plate (832), at least one half wave plate (836) and at least one quarter wave plate (834).

49. A system according to claim 48 wherein said at least one Brewster plate comprises zinc selenide material.

50. A system according to claim 46 incorporating a beam former enlarging the diameter of said outgoing beam.

51. A system according to claim 50 wherein said beam former comprises at least one lens (815, 816).

52. A system according to claim 46 wherein the splitter (824, 826) is arranged to divert a fraction in a range of 0.001% to 10% of said input beam into said reference beam.

53. An analyzer according to claim 15 wherein said detecting means (818) comprises at least one cadmium mercury telluride photodetector.

54. An analyzer according to claim 15 incorporating:

a phase modulator applying at least one modulating signal to phase modulate said at least partially coherent radiation and a computer generating said modulating signal and for phase comparing said interference signals with said modulating signal to determine distance between the system and the remote scene.

55. A radiation field analyzer according to claim 2 wherein said multimode waveguide structure comprises an arrangement of solid waveguides.

56. A radiation field analyzer according to claim 55 wherein said solid waveguides are of semiconductor material.

57. A radiation field analyzer according to claim 56 wherein said semiconductor material is one of GaAs and GaAlAs.

* * * * *